United States Patent
Alessandrini

(10) Patent No.: US 12,546,510 B2
(45) Date of Patent: Feb. 10, 2026

(54) HEAT EXCHANGER FOR HEATING DEVICES, AND TUBE-ASSEMBLY MODULE FOR A HEAT EXCHANGER

(71) Applicant: COSMOGAS S.R.L., Meldola (IT)

(72) Inventor: Alberto Alessandrini, Meldola (IT)

(73) Assignee: CLADA S.R.L., Meldola (IT)

( * ) Notice: Subject to any disclaimer, the term of this patent is extended or adjusted under 35 U.S.C. 154(b) by 402 days.

(21) Appl. No.: 18/019,398

(22) PCT Filed: Aug. 3, 2021

(86) PCT No.: PCT/IB2021/057099
§ 371 (c)(1),
(2) Date: Feb. 2, 2023

(87) PCT Pub. No.: WO2022/029624
PCT Pub. Date: Feb. 10, 2022

(65) Prior Publication Data
US 2023/0228455 A1     Jul. 20, 2023

(30) Foreign Application Priority Data

Aug. 7, 2020  (IT) .......................... 102020000019816

(51) Int. Cl.
*F24H 1/00*   (2022.01)
*F24H 1/10*   (2022.01)
(Continued)

(52) U.S. Cl.
CPC ............. *F24H 1/54* (2022.01); *F24H 1/0027* (2013.01); *F24H 1/107* (2013.01); *F24H 1/145* (2013.01);
(Continued)

(58) Field of Classification Search
CPC .......... F24H 1/54; F24H 1/0027; F24H 1/403; F28F 1/26; F28F 2215/10; F28F 2255/146
See application file for complete search history.

(56) References Cited

U.S. PATENT DOCUMENTS 4,434,841 A * 3/1984 Jackson ................ F28D 1/0472
                                                        165/172
2003/0192684 A1* 10/2003 Roberts ..................... F28D 7/08
                                                        165/174
(Continued)

FOREIGN PATENT DOCUMENTS

| DE | 88 00 105 | 2/1988 |
| EP | 2 550 488 | 1/2013 |

(Continued)

OTHER PUBLICATIONS

International Search Report and Written Opinion of the ISA for PCT/IB2021/057099, mailed Oct. 25, 2021, 13 pages.

*Primary Examiner* — Steven S Anderson, II
*Assistant Examiner* — Kurt Wolford
(74) *Attorney, Agent, or Firm* — Nixon & Vanderhye P.C.; Lars H. Genieser

(57) ABSTRACT

A heat exchanger for a boiler or similar heating device comprises a casing and a tube assembly inside the casing. The tube assembly includes a plurality of modules ($6_x$, $6_y$) arranged in a juxtaposed configuration, each module ($6_x$, $6_y$) having an at least approximately annular shape. The modules ($6_x$, $6_y$) each include a respective tube (7) that is at least partially embedded in a respective thermally conductive body (8) overmoulded to the tube (7). Each thermally conductive body (8) defines an upper face and a lower face of the respective module ($6_x$, $6_y$), where at least at the upper face of a first module ($6_y$) and the lower face of a second (Continued)

module ($6_x$) the corresponding thermally conductive body (8) defines upper fins (24) and lower fins ($23_x$), respectively, which extend in height substantially in an axial direction of the tube assembly and extend in length substantially in a radial direction of the tube assembly (5). The upper fins (24) of the thermally conductive body (8) of the first module ($6_y$) are in an axially staggered position with respect to the lower fins ($23_x$) of the thermally conductive body (8) of the second module ($6_x$), with the upper fins (24), on the one hand, and with the lower fins ($23_x$), on the other hand, which are at mutual distances such that the upper fins (24) of the thermally conductive body (8) of the first module ($6_y$) are set between the lower fins ($23_x$) of the thermally conductive body (8) of the second module ($6_x$), or vice versa. In this way, between each upper fin (24) of the thermally conductive body (8) of the first module ($6_y$) and each lower fin ($23_x$) of the thermally conductive body (8) of the second module ($6^x$), or vice versa, a respective radial passageway (P) is defined for the combustion fumes produced by a burner equipping the heat exchanger.

20 Claims, 17 Drawing Sheets

(51) Int. Cl.
*F24H 1/14* (2022.01)
*F24H 1/40* (2022.01)
*F24H 1/54* (2022.01)
*F24H 9/00* (2022.01)
*F28F 1/24* (2006.01)
*F28F 1/26* (2006.01)
*F28F 1/32* (2006.01)

(52) U.S. Cl.
CPC ........... *F24H 1/403* (2013.01); *F24H 9/0031* (2013.01); *F28F 1/24* (2013.01); *F28F 1/26* (2013.01); *F28F 1/32* (2013.01); *F28F 2215/10* (2013.01); *F28F 2255/146* (2013.01)

(56) References Cited

U.S. PATENT DOCUMENTS

| | | |
|---|---|---|
| 2005/0120981 A1 | 6/2005 | Ferguson et al. |
| 2010/0206538 A1* | 8/2010 | Chen ..................... H01L 23/467 165/185 |
| 2013/0228321 A1* | 9/2013 | Williams .................. F28F 1/24 165/183 |
| 2020/0032536 A1* | 1/2020 | Corn ....................... F24H 1/145 |

FOREIGN PATENT DOCUMENTS

| | | | |
|---|---|---|---|
| FR | 2237161 | 2/1975 | |
| WO | WO-2021026397 A1 * | 2/2021 | ........... F28D 9/0012 |

\* cited by examiner

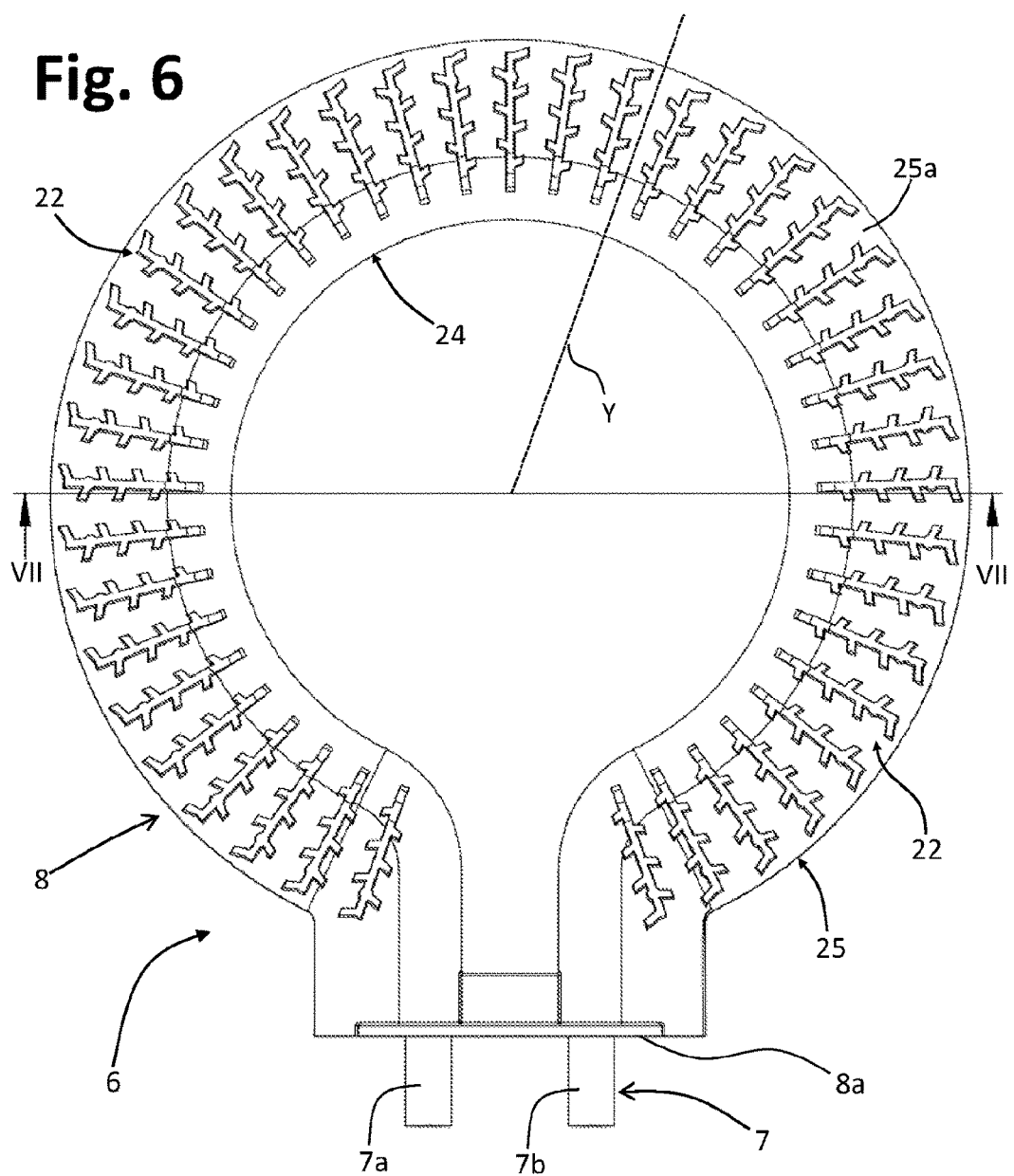
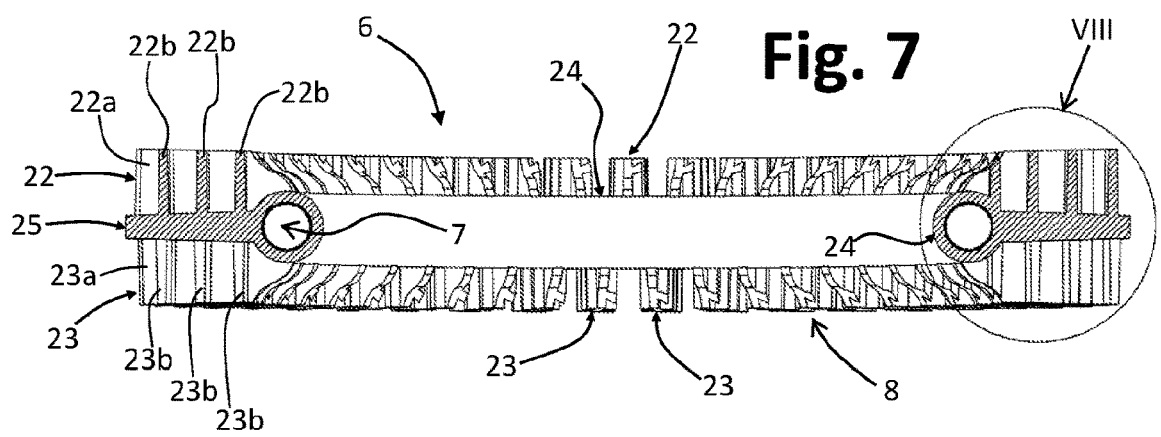

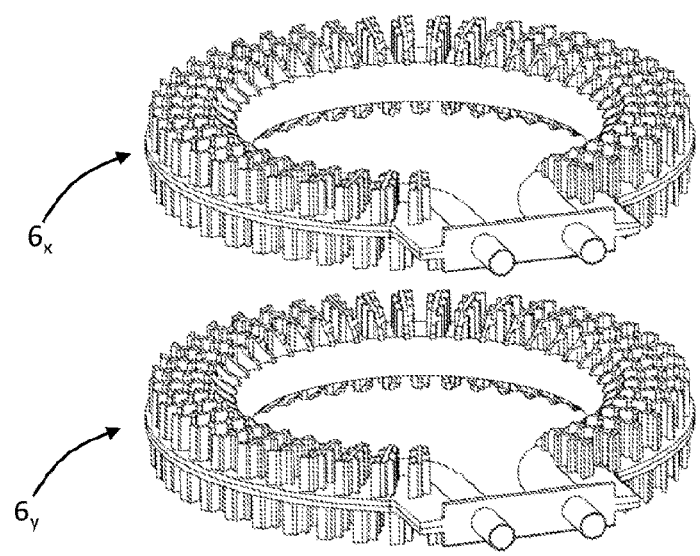
Fig. 12
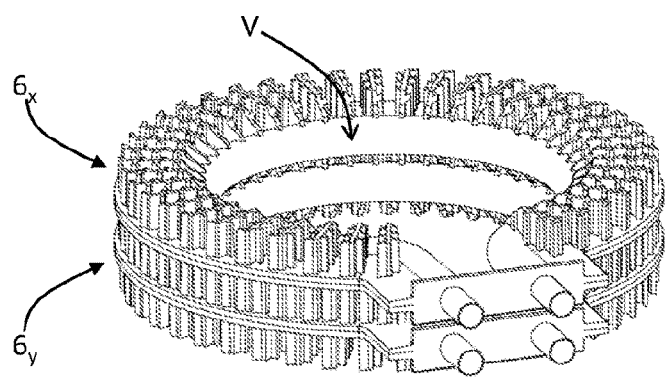
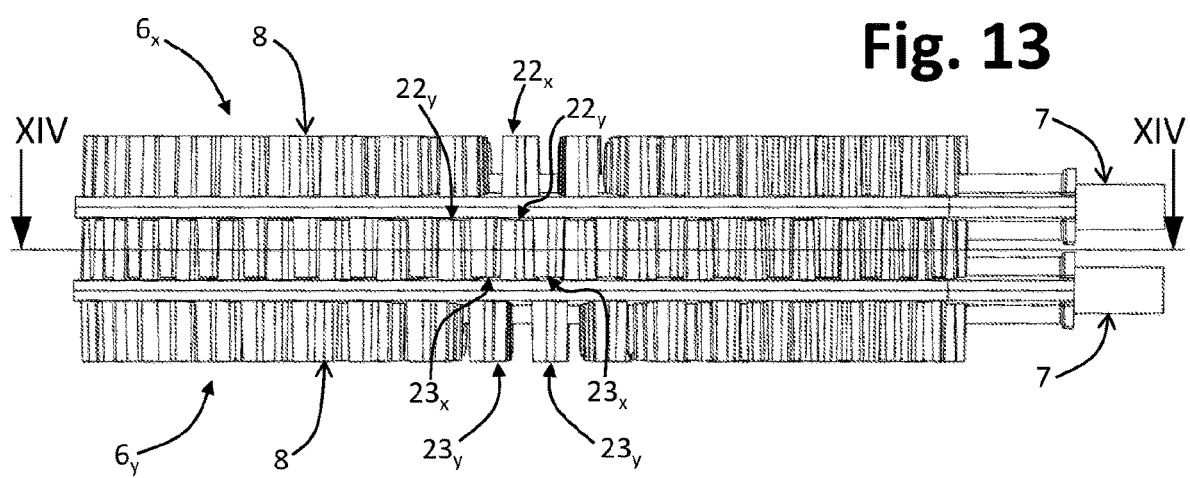
Fig. 13

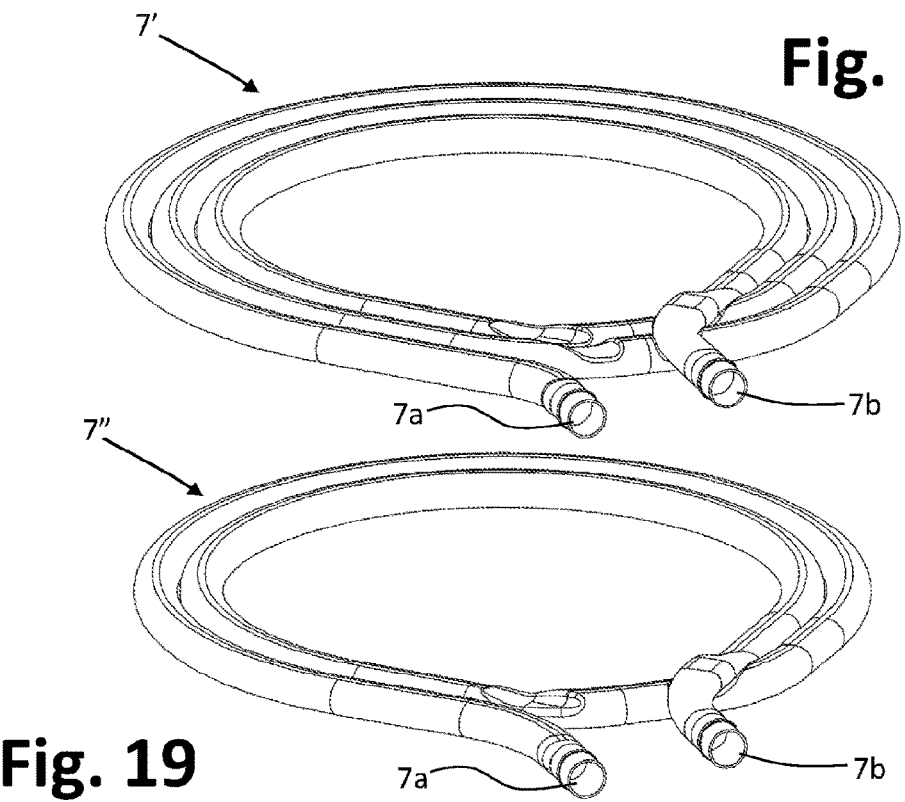
Fig. 18
Fig. 19
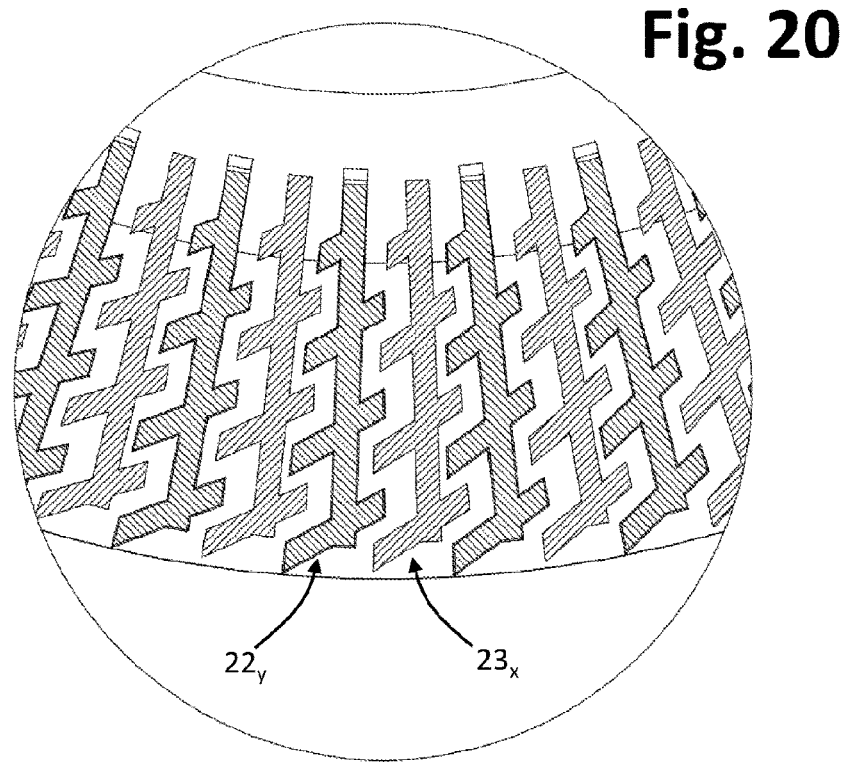
Fig. 20

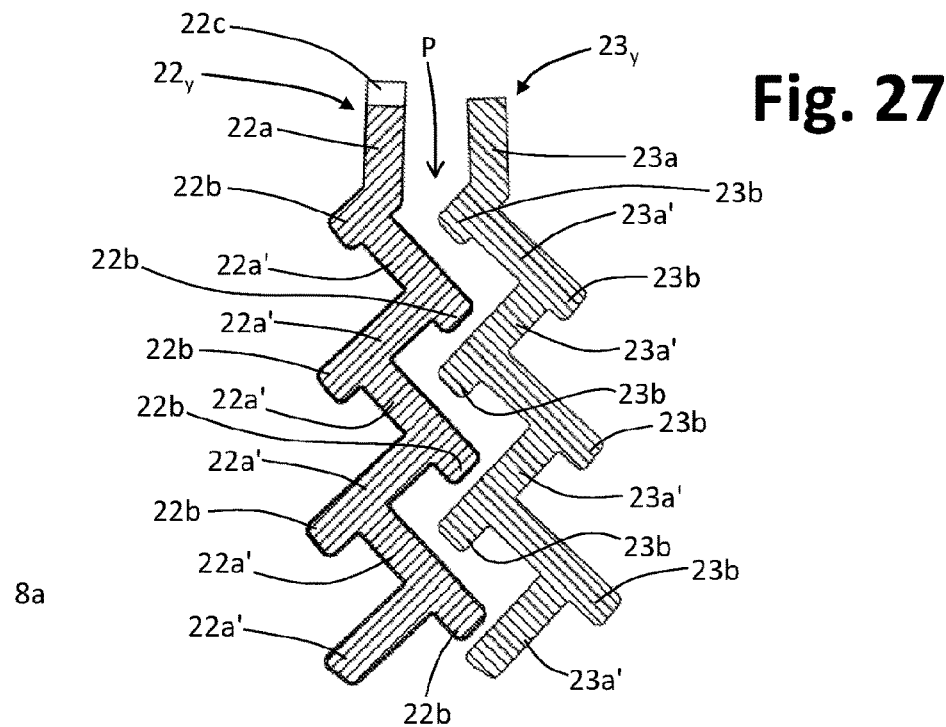
Fig. 27
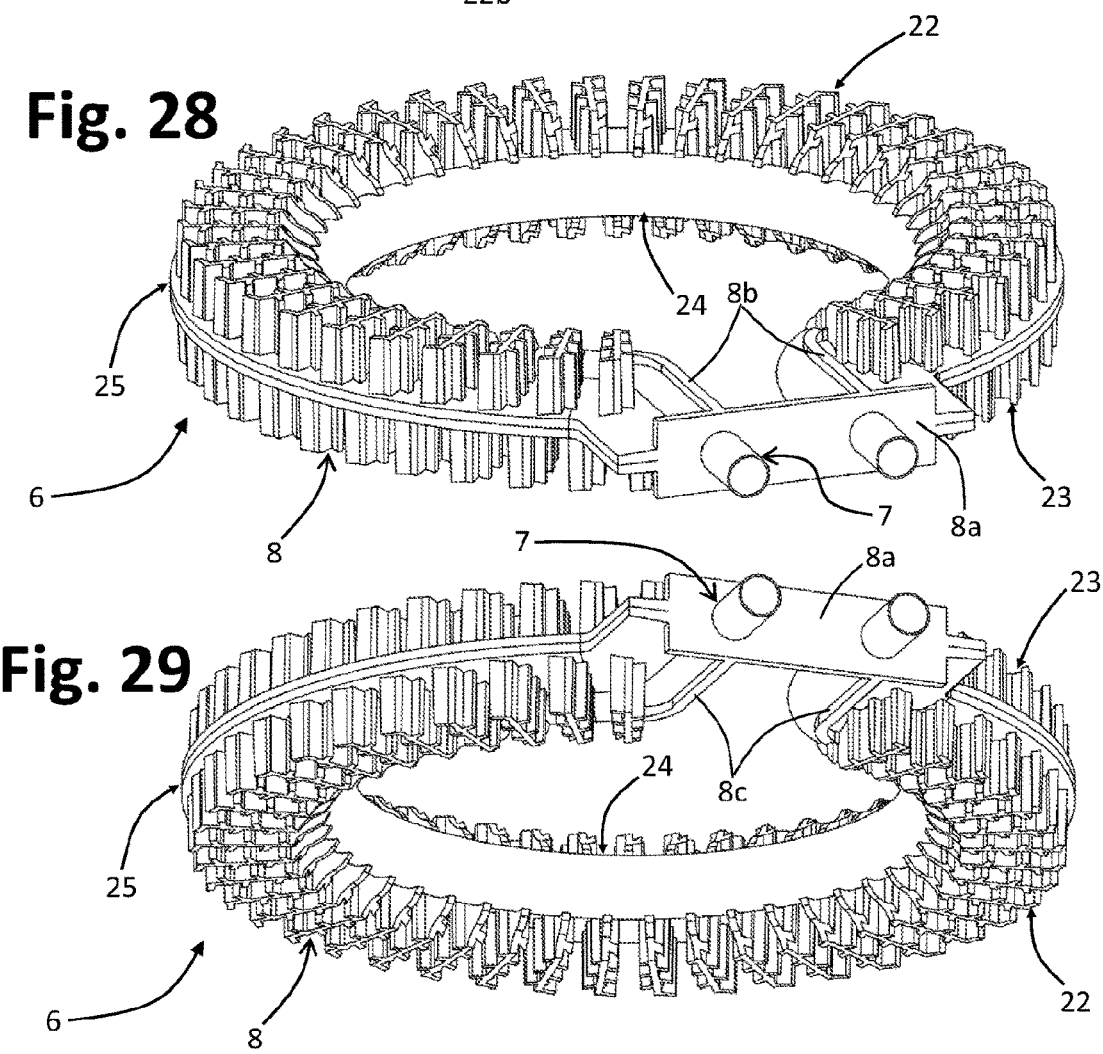
Fig. 28
Fig. 29

HEAT EXCHANGER FOR HEATING DEVICES, AND TUBE-ASSEMBLY MODULE FOR A HEAT EXCHANGER

This application is the U.S. national phase of International Application No. PCT/IB2021/057099 filed Aug. 3, 2021, which designated the U.S. and claims priority to IT patent application No. 102020000019816 filed Aug. 7, 2020, the entire contents of each of which are hereby incorporated by reference.

FIELD OF THE INVENTION

The present invention refers to heat exchangers for heating devices in general, in particular heaters for chlorinated or salt water for swimming pools, outdoor whirlpools or spa installations; the invention can in any case also be used for the construction of heat exchangers used in other types of heating devices, such as boilers for heating sanitary water or water for room heating. The invention has been developed with particular reference being paid to the construction of tube assemblies for such heat exchangers.

PRIOR ART

The function of a heat exchanger is to transfer thermal energy between two fluids. For example, in the case of customary domestic gas boilers, the function of the heat exchanger is to heat water circulating inside it, starting from the hot fumes that result from the combustion produced via a burner. The same principle is basically exploited also in other gas heating devices, such as the aforesaid water heaters for swimming pools, outdoor whirlpools, or spa installations.

In order to recover the heat contained in the fumes, the heat exchanger in general comprises a casing, defining a combustion chamber within which a water-circulation path develops, against which the fumes are made to flow. For efficiency reasons it is necessary to have a heat-exchange surface between the fumes and the water path that is as extensive as possible. For this purpose, in various known solutions, the aforesaid water-circulation path includes a tube wound in a helix, or a plurality of tubes wound in a helix arranged substantially concentrically, the innermost tube of the plurality surrounding the burner. In a first type of solutions, the tube assembly comprises a number of helical tubes arranged concentrically that operate in parallel; i.e., they each extend between an inlet chamber and an outlet chamber of the heat exchanger, which are often defined at the two axial ends of the corresponding casing. In a second type of solutions, the tube assembly comprises a number of helical tubes arranged concentrically, which are connected in series, via substantially U-shaped connectors, so that the water enters the heat exchanger from the inlet of the first tube of the series and exits from the heat exchanger through the outlet of the last tube of the series. Known heat exchangers with tubes wound in a helix are in general far from flexible from the production standpoint given that production of boilers that have different thermal powers presupposes pre-arrangement of helical tubes with different axial dimensions. As has been said, in fact, the thermal power of a heat exchanger depends, among other things, upon the heat-exchange surface so that, in general, heat exchangers conceived for different thermal powers must differ from one another as regards the number of volutes of the various tubes, and hence as regards the axial dimensions of the corresponding helices.

There have also been proposed heat exchangers, the tube assembly of which is obtained by juxtaposing or stacking a plurality of tubes, each shaped to define a substantially plane spiral, or a part thereof. In some of these solutions, the two end portions of each tube are in general connected to a delivery manifold and to a return manifold, respectively, i.e., with a connection in parallel of the tubes themselves. In other solutions, series-parallel connections are provided, i.e., with first tubes of the assembly which have respective inlet ends connected to an inlet or return manifold, second tubes of the assembly which have respective outlet ends connected to an outlet or delivery manifold, whereas the outlet ends of the first tubes and the inlet ends of the second tubes are connected to one and the same intermediate manifold: in this way, water entering the exchanger via the first tubes is heated by the fumes produced by a gas burner, to pass then into the second tubes—via the intermediate manifold—to be further heated by the fumes produced by the burner, to finally leave the exchanger towards the final user. With solutions of this type the tube assembly has a substantially modular structure, thereby enabling to compose in a simple way tube assemblies having different heights, and hence different powers.

In the specific case of water heaters for swimming pools and the like, a consistent practice provides for the use of modular heat exchanger, composed by a plurality of stacked finned tubes, mainly formed by copper or stainless-steel. The fins of the tubes do enable to increase the thermal exchange with the fumes produced by the burns: however, the overall efficiency of the device is not particularly high.

Another problem of this type of solution is that copper or stainless-steel tubes are particularly subject to corrosion phenomena, both due to the salinity of the water or the acidity of the water-chlorine mixture to be fed to the pool, and due to the high speed of such water or mixture that passes through the exchanger. In some alternative solutions, for the heating of water for swimming pools and the like, a boiler of the type commonly used for heating domestic water or for space heating can be used, in which case—to avoid corrosion due to the chlorinated or salt water of the pool—a titanium plate exchanger is set between the boiler and the supply and return water branches with respect to the pool: in this way, the salt or chlorinated water circulates in the titanium plate exchanger only, without ever coming into contact with the heat exchanger of the boiler. This solution, in addition to being expensive, involves a reduced efficiency, as the condensation in the primary exchanger (the boiler exchanger) is limited by the secondary exchanger (the plate heat exchanger); energy consumption is also generally higher, in view of the need to equip the system with an additional circulator, between the boiler and the plate heat exchanger.

US 2013/0228321 A1 discloses a heat exchanger comprising:
 a heat conductive tubular member helically coiled about a longitudinal axis and having longitudinally spaced apart coils; and
 a series of heat transfer fins circumscribing the coiled tubular member and being spaced apart along its length in a heat conductive relationship therewith,
 wherein the fins on longitudinally adjacent pairs of coils of said tubular member has nested facing edge portions which collectively form a seal area that coils between the tubular member adjacent coil pairs in axially spaced relationships therewith, said seal area substantially impeding fluid flow therethrough in a direction generally transverse to said longitudinal axis.

FR 2237161 A1 discloses a heating convector formed by a tube provided with radial projections or fins, wherein the tube traversed by the heating fluid is made of cast iron and has an aluminium overmoulding which surrounds the tube and forms the radial projections.

SUMMARY OF THE INVENTION

In view of the foregoing, one of the aims of the present invention is essentially to obtain a heat exchanger for a boiler or similar heating device, in particular for heating chlorinated or salt water for swimming pools, outdoor whirlpools or spa installations, distinguished by an increased efficiency in terms of heat exchange with respect to combustion fumes produced by a burner, as well as compact in size, simple in manufacturing and distinguished by high production flexibility.

An auxiliary aim of the invention is to obtain such a heat exchanger of increased reliability over time, particularly in the case of its use for the heating of fluids which are particularly critical for fluid-dynamic reasons (flow speed) and/or for chemical reasons (acidity or salinity of the fluid to be heated), which are typically the applications in the field of swimming pools and spa installations in general.

One or more of the above aims is attained, according to the invention, by a heat exchanger and a tube-assembly module for a heat exchanger having the characteristics indicated in the attached claims. The invention also relates to a heating device including such a heat exchanger, as well as a method for obtaining a tube assembly for a heat exchanger.

The claims form an integral part of the technical teaching provided herein in relation to the invention.

BRIEF DESCRIPTION OF THE DRAWINGS

Further aims, characteristics and advantages of the invention will result from the following description, supplied with reference to the annexed drawings, provided purely as a non-limiting example, in which:

FIG. 6 is a schematic view from the top of a module of the type shown in FIG. 4;

FIG. 7 is a schematic section according to line VII-VII of FIG. 6;

FIG. 12 is a schematic representation to exemplify a staking phase of two modules of the type shown in FIG. 4;

FIG. 13 is a schematic side view of an assembly including the two modules of FIG. 12;

FIGS. 18 and 19 are schematic perspective views of tubes that can be used for obtaining modules of a tube assembly of a heat exchanger in accordance with possible variants embodiments;

FIGS. 20-21, 22-23, 24-25 and 26-27 are views similar to those of FIGS. 15-16, respectively, relating to possible variants embodiments;

FIGS. 28 and 29 are views similar to those of FIG. 4, relating to further possible variants embodiments.

DESCRIPTION OF PREFERRED EMBODIMENTS OF THE INVENTION

The reference to "an embodiment" and the like within this description indicates that at least one particular configuration, structure, or characteristic described in relation to the embodiment is included in at least one embodiment. Thus, phrases such as "in one embodiment", "in an embodiment", "in various embodiments" and the like, possibly present in different places of this description, do not necessarily refer to the same embodiment, but may instead refer to different embodiment. In addition, particular conformations, structures or characteristics defined within this description may be combined in any appropriate way into one or more embodiments, even different from those depicted. The numerical and spatial references (such as "upper", "lower", "high", "low", "front", "back", "vertical", etc.) used herein, particularly with reference to the examples in the figures, are for convenience only and therefore do not define the scope of protection or the scope of the embodiments. In this description and in the attached claims, the generic term "material" shall also include mixtures, compositions or alloys of several different materials. The same reference numbers are used in the figures to indicate similar or technically equivalent elements.

Figure 1:
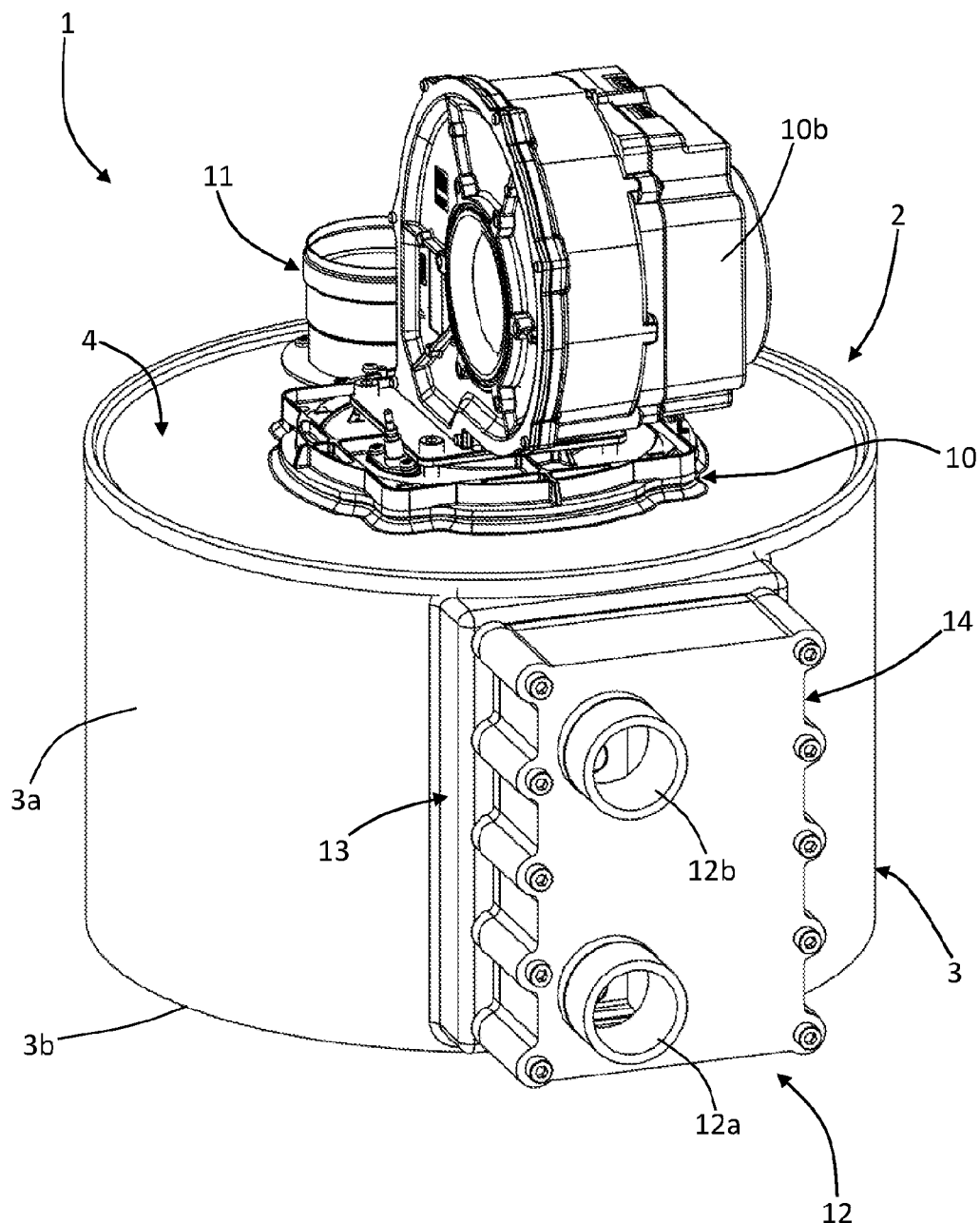
FIG. 1 is a schematic perspective view of a heat exchanger according to possible embodiments of the invention.
Figure 2:
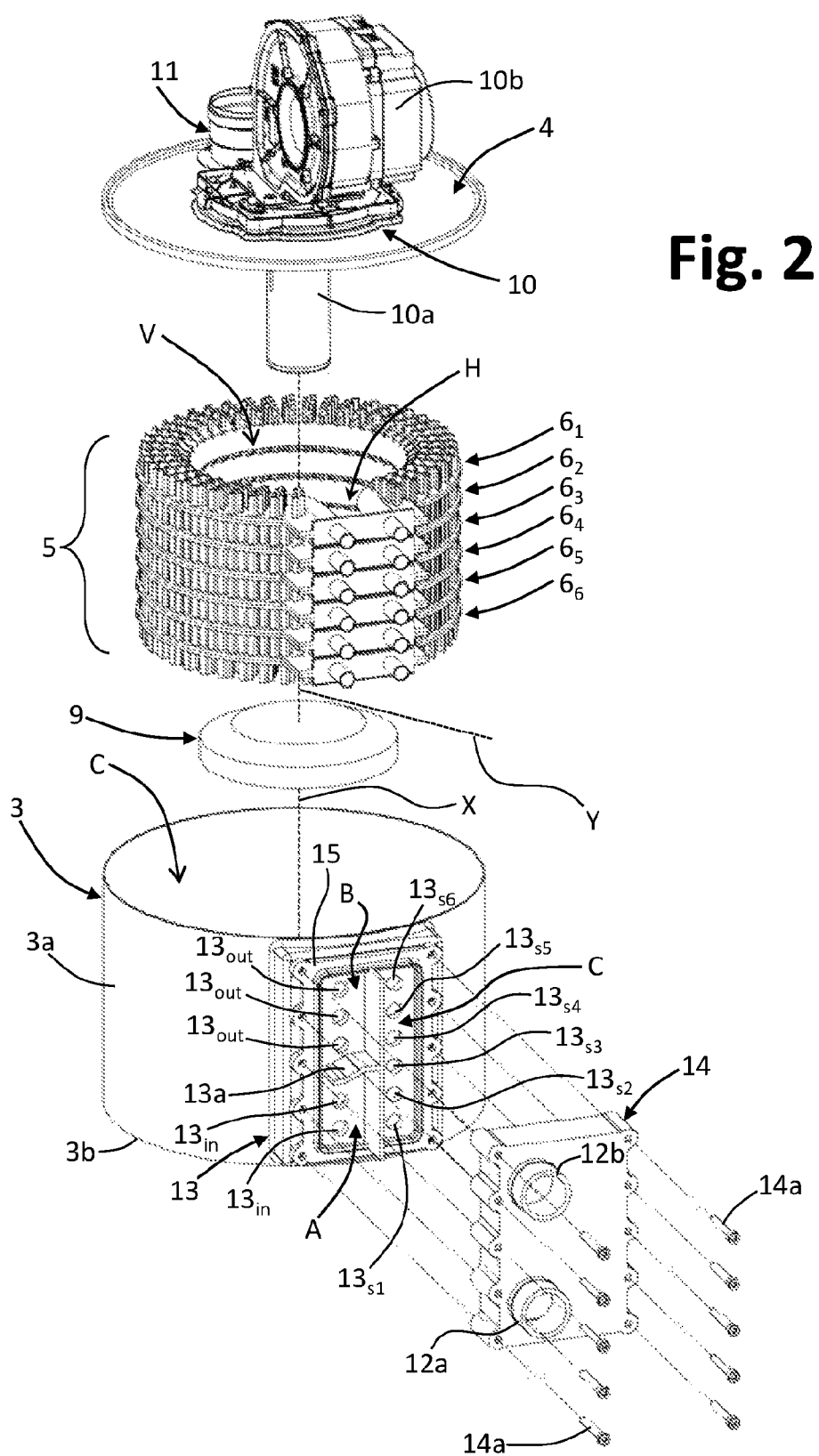
FIG. 2 is an exploded schematic view of a heat exchanger according to possible embodiments of the invention.

Referring initially to FIGS. 1 and 2, with 1 is indicated as a whole a heat exchanger according to possible embodiments.

The exchanger 1 has a hollow casing 2 defining a combustion chamber, indicated by C in FIG. 2. In the example, the casing 2 comprises two parts 3 and 4 made of sheet metal, for example steel. The part indicated by 3 defines in a single piece a peripheral wall 3a and a back wall 3b, while the part indicated with 4 basically realizes an upper cover of the casing 2. The casing 2 could in any case be formed by more than two parts. In the example, the casing 2 is substantially cylindrical, but this shape should not be understood as essential.

Inside the casing 2 is housed a tube assembly, indicated with 5 as a whole in FIG. 2, which is formed by the juxtaposition in an axial direction X of a plurality of substantially planar modules 6, each of which includes at least one tube; in the example, assembly 5 includes six modules 6, but this number must be understood as merely illustrative, since the number of modules might be in fact greater or smaller.

Figure 3:
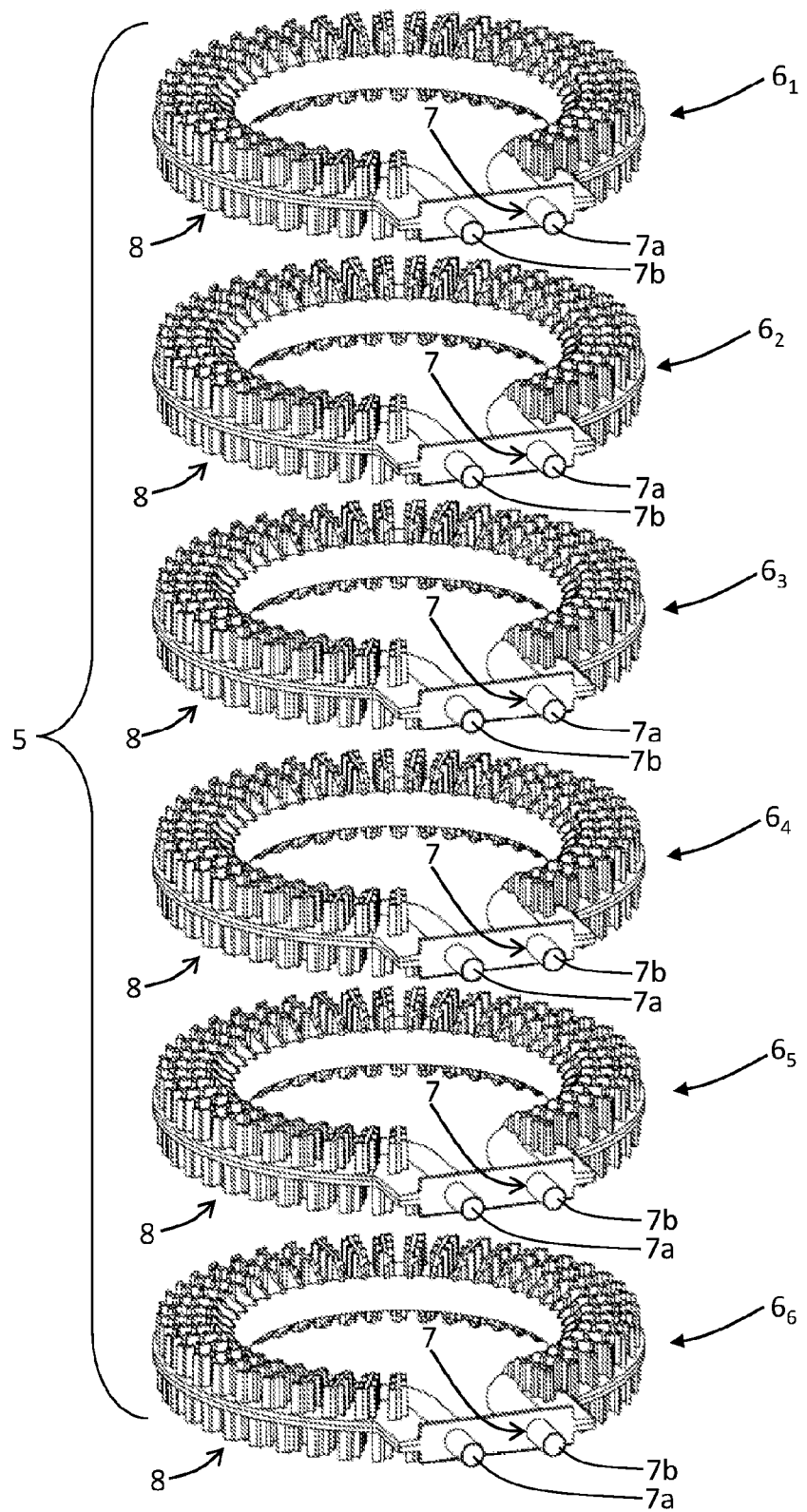
FIG. 3 is an exploded schematic view of a tube assembly of a heat exchanger according to possible embodiments of the invention.
Figure 4:
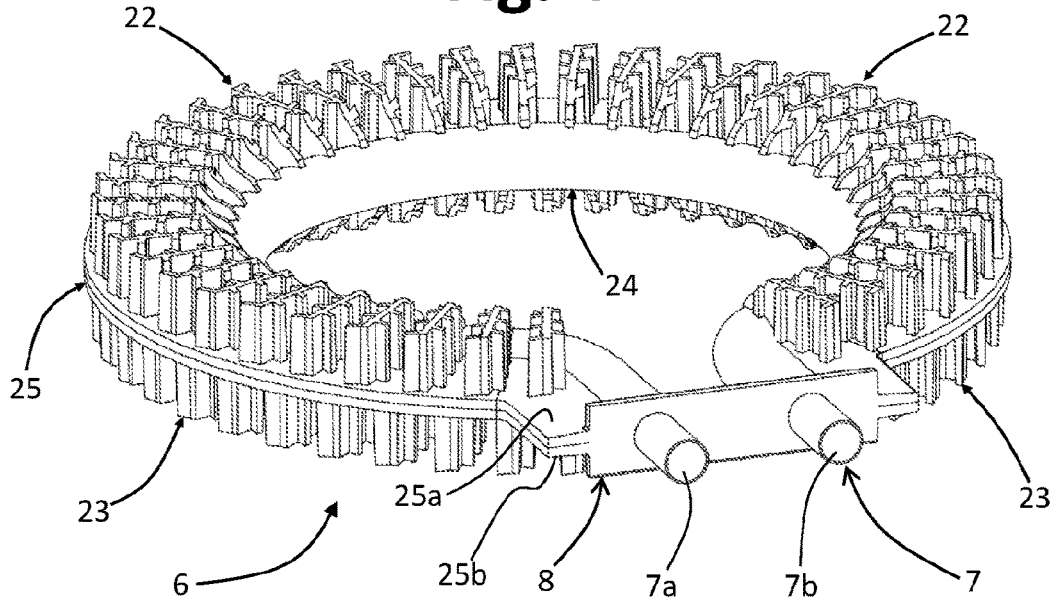
FIG. 4 is a schematic perspective view of a module of a tube assembly of a heat exchanger according to possible embodiments of the invention.

The assembly 5 is shown in isolation in an exploded configuration in FIG. 3, while in FIG. 4 a single module 6 is represented; in FIGS. 2 and 3, the reference "6" of each module is subscripted with a number corresponding to the position of the module within the tube assembly 5, starting from the top, for reasons of easier description.

Modules 6 are preferably the same as each other, although the two modules $6_1$ and $6_6$ arranged at the two axial ends of the assembly 5 may be possibly different from the possible interposed modules $6_2$-$6_5$.

Figure 5:
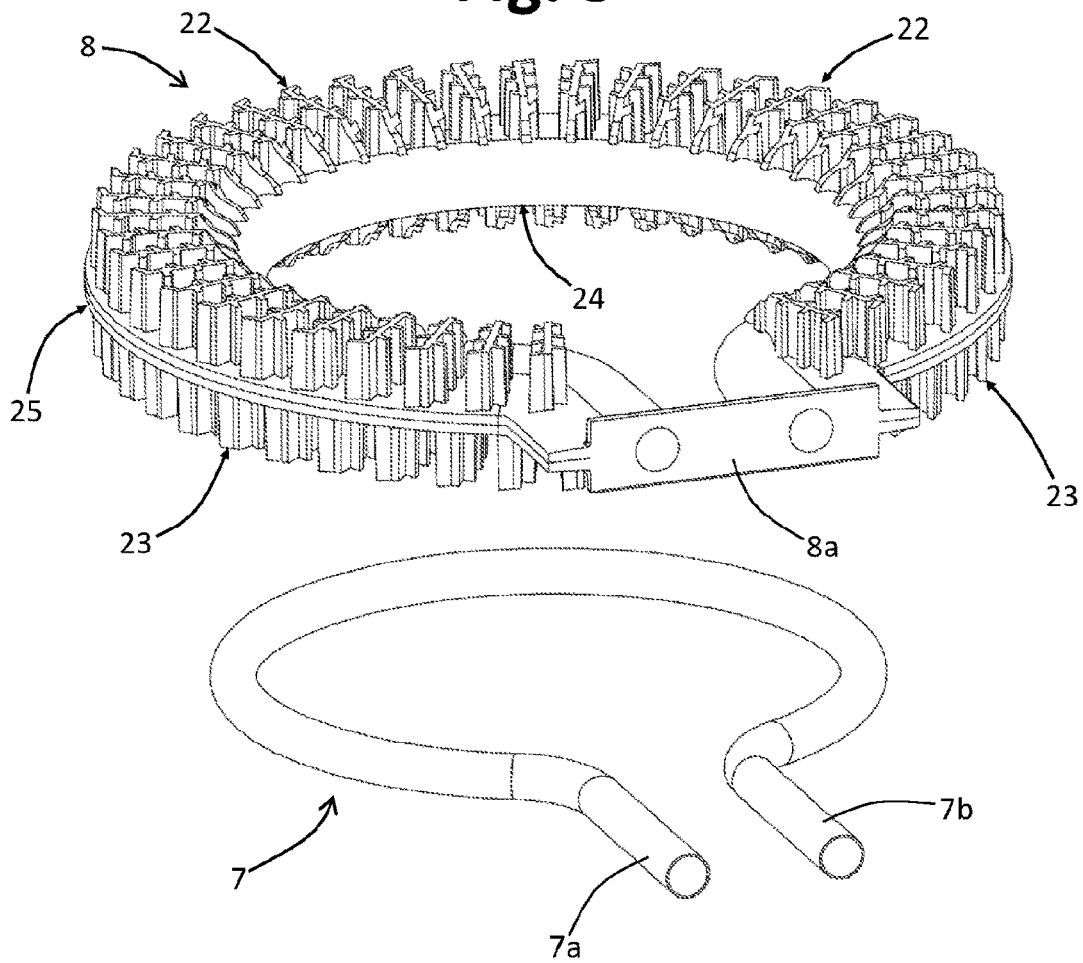
FIG. 5 is an exploded schematic view of a module of the type shown in FIG. 4.

As can be seen in FIGS. 4-6, each module 6 essentially consists of a 7 tube of metal material, which is at least partially embedded in a thermally conductive body 8 of metal material. Preferably, the metal material constituting tube 7 is different from the metal material constituting body 8. In preferential embodiments, the thermally conductive body 8 is a one-piece body that is overmoulded to the respective tube 7, while still leaving the two ends of the latter accessible, for the purpose of fluidic connection.

Tube 7 is preferably conformed so as to have a shape at least approximately annular and substantially planar. Referring to the example illustrated in FIG. 5, tube 7 extends substantially according to an arc of a circle of less than 360° (for example about) 315°, with two end portions at least approximately straight, which protrude outwards of the circumference identified by the aforementioned arc of circle. In the example, the aforementioned end portions, designated by 7a and 7b, identify—depending on the mode of fluidic connection—an outlet and an inlet of the tube 7, and extend substantially parallel to each other, although this does not represent an essential characteristic. Each module 6 therefore has a respective inlet and a respective outlet for hydraulic connection.

Note that the shape defined by tube 7 and/or the overall shape of the module 6 might be substantially oval or oblong, rather than substantially circular as exemplified in the figures.

The thermally conductive body 8, described extensively below, is preferably formed with a material having high thermal conductivity and predominantly surrounds the tube 7. In the example shown, from body 8 there protrude only the terminal sections of the abovementioned end portions 7a and 7b, for hydraulic connection of the respective module 6.

As can be seen, therefore, in various embodiments the modules 6 have an overall shape that is at least approximately annular and substantially planar, so that their superimposition determines a tube assembly 5 approximately cylindrical, defining an axial hollow volume, indicated by V in FIG. 2.

The exchanger 1 comprises a fuel burner, in particular a gas burner, which is associated to the casing 2 and that extends at least partially into said hollow volume V of tube group 5, or faces said volume. For this purpose, in the example shown, within the hollow volume V, an axially extended flame holder 10a is designed to project from above, the flame holder being part of a gas burner assembly indicated with 10 as a whole. In various embodiments, the burner assembly 10 is of the pre-mix type, that is, it provides for a combustion of only gas and primary air, which are mixed upstream of a gas burner: for this purpose, in such embodiments, the burner assembly 10 also includes a pre-mixing fan 10b.

In various embodiments the burner assembly 10 is mounted on the cover 4, at a corresponding mounting opening, substantially in a central position.

At one end of volume V, here conventionally referred to as the "lower end", inside casing 2 a mass of thermally insulating material 9 is arranged, here having a substantially discoid shape. A similar second insulating mass—not visible in FIG. 2—is preferably also provided at the upper end of the volume V, this second mass being obviously provided with a central opening for passage of the flame holder 10a of the burner 10 (see for reference FIG. 28).

The casing 2 has a fume outlet, in order to allow the outflow of combustion fumes produced by a flame at the burner 10, particularly at its flame holder 10a. In the example shown, the cover 4 has—for this purpose—an additional opening, substantially in a peripheral or eccentric position, at which an exhaust fitting 11 is mounted for the fumes intended to flow outside the combustion chamber C defined by the casing 2.

In various embodiments, the diameter of the tube assembly 5 is smaller than that of the peripheral wall 3a of the casing 2, such that between the former and the latter an annular cylindrical gap is defined, in which the fumes produced by the combustion of the air-gas mixture at the flame holder 10a can flow to, through suitable radial passages defined between the juxtaposed modules 6, as explained below. The exhaust passage of the fumes including the fitting 11 is preferably allocated substantially at the aforementioned cylindrical gap, and it can be operatively associated with the suction branch of a fan, not represented, in order to facilitate evacuation of the fumes from the exchanger 1.

The heat exchanger 1 has an inlet and outlet for a fluid that has to be heated, which here is assumed to be chlorinated water for a pool.

In various embodiments the exchanger 1 includes at least two manifolds, to which the tubes 7 of the various modules 6 are hydraulically connected, in particular through their end portions 7a and 7b. In the non-limiting example shown, a manifold assembly is provided for this purpose, indicated with 12 as a whole in FIG. 1, which integrates three different manifolds, as explained below. In the example, at the manifold group 12 there are defined an inlet or return connection 12a for the water coming from the pool, which has to be heated, and an outlet or delivery connection 12b for the water that has to be sent hot to the pool.

In various embodiments, as exemplified in FIG. 2, the collector assembly 12 includes a connection plate 13 and a related hollow cover 14, the latter including the connections 12a and 12b. Cover 14 can be fixed on the plate 13 by means of suitable threaded 14 members, preferably with the interposition of at least one sealing gasket 15.

In the example, the plate 13 is associated to the peripheral wall 3a of body 3, at a corresponding opening, and has a plurality of through holes, to which the ends 7a and 7b of the tubes 7 of the various modules 6 are designed to be sealingly fixed; in the example, for this purpose, there are provided two vertical rows of holes, substantially parallel to each other, each comprising a number of holes corresponding to that of the modules 6, one array including the holes indicated with $13_{in}$ and $13_{out}$, and the other including the holes indicated with $13_{s1}$ to $13_{s6}$.

The plate 13 has associated thereto a shaped baffle 13a, for example substantially T-shaped, intended to cooperate with the cavity of cover 14 to define the three aforementioned manifolds, or to ensure that within the manifold assembly 12 three chambers are identified (see references A, B and C in FIG. 2), to which there correspond different holes of the plate 13, and in particular a first chamber (A) to holes $13_{in}$ correspond, a second chamber (B) to holes $13_{out}$ correspond and a third chamber (C) to which holes $13_{s1}$-$13_{s6}$ corresponds, and where the return connections 12a and the delivery connections 12b defined in the cover 14 are respectively in fluid communication with the aforementioned first chamber and second chamber.

In the example, the inlet ends of tubes 7 of the modules $6_4$, $6_5$ and $6_6$ are intended to be connected the holes of the first chamber (A), i.e., the holes indicated by $13_{in}$, whereas the outlet ends of tubes 7 of the modules $6_1$, $6_2$ and $6_3$ are intended to be connected to the holes of the second chamber (B), i.e., the holes indicated by $13_{outs}$. In relation to the third chamber (C), the outlet ends of tubes 7 of the modules $6_4$, $6_5$ and $6_6$ are intended to be connected to the holes indicated by $13_{s1}$, $13_{s2}$ and $13_{s3}$, while the inlet ends of tubes 7 of the modules $6_1$, $6_2$ and $6_3$ are intended to be connected to the holes indicated by $13_{s4}$, $13_{s5}$ e $13_{s6}$. As can be imagined, with such an arrangement, the water coming from the pool that must be heated penetrates into the first chamber (A) through the connection 12a, and then flows in parallel into the tubes 7 of modules $6_4$, $6_5$ and $6_6$ and thus undergoes a first heating by the fumes produced by the burner 10; this water then reaches the third chamber (C), through holes $13_{s1}$, $13_{s2}$ and $13_{s3}$, to then flow in parallel into the tubes 7 of modules $6_1$, $6_2$ and $6_3$, through holes $13_{s4}$, $13_{s5}$ and $13_{s6}$, and then be subjected to further heating by the fumes produced by the burner 10: this further heated water then reaches the second chamber (B) to be directed back to the pool, through the connection 12b.

In the example, therefore, the manifold assembly group 12 integrates a return manifold (corresponding to the aforementioned first chamber A including holes $13_{in}$), a supply manifold (corresponding to the aforementioned second chamber B including holes $13_{out}$) and an intermediate manifold for a series-parallel connection (corresponding to the aforementioned third chamber C including holes $13_{s1}$-$13_{s6}$).

Note that the case exemplified in the figures is only one of the possible modes of hydraulic connection of the modules 6 of the tube assembly 5, and that therefore the modes of fluidic connection among the tubes of the various modules could be different. For example, in other embodiments, the heat exchanger could even include only two manifolds, that is, a return manifold to which the inlet ends of the tubes are connected and having associated thereto an inlet for the water to be heated, and a delivery manifold, to which the outlet ends of the tubes are connected and having associated thereto an outlet for the heated water. In addition, two or more manifolds do not necessarily have to be integrated into a single manifold assembly, as in the example, as the exchanger could include at least two physically separated manifolds, even at a distance from each other.

Regardless of the specific realization, what matters is that the tube 7 of each module 6 is part of a hydraulic circuit of the heat exchanger 1, for the fluid to be heated, with such a hydraulic circuit that extends between at least one inlet 12a and at least one outlet 12b for the fluid.

In various embodiments, the metal material of the tube 7 and the metal material of the thermally conductive body 8 of each module 6 have substantially similar thermal expansion characteristics. In preferred embodiments, tube 7 is formed of titanium or a titanium alloy, preferably a grade 2 titanium, while the thermally conductive body 8 is formed of aluminum or an aluminum alloy, preferably a low copper and low zinc aluminum alloy, such as ALSI10 alloy, which is particularly suitable for resisting to condensation corrosion.

The preferential use of titanium and aluminum as the basic materials for manufacturing the modules 6 is due to the peculiar characteristics of these materials. Titanium is in fact suitable to maintain the temperature of the heated liquid and to resist corrosion, particularly in presence of chlorinated water or salt water (which makes use of the exchanger advantageous for heating water for swimming pools and the like). On the other hand, aluminum, in view of its high thermal conductivity characteristics, lends itself to effectively capturing the heat of the combustion fumes produced by the burner of the exchanger, and transmitting it to the titanium tube, i.e., to the liquid that flows thereinto. Moreover, aluminum itself has good corrosion resistance characteristics, which make it suitable for the use considered herein.

As indicated, in various preferential embodiments, the body 8 is overmoulded to the tube 7. Overmoulding can take place in a press suitable for the moulding of aluminum or its alloys, for example equipped with a crucible suitable to contain the molten alloy of aluminum and a mould in at least two parts with impressions configured to define the particular profiles described below. In essence, in applications of this type, the previously shaped titanium tube 7 is placed inside the open mould; then, closure of the press, or of the mould, which blocks and encloses at least part of the tube 7, is controlled; then the injection of the molten aluminum alloy is carried out inside the closed mould, with this molten alloy that "wraps" externally at least part of the tube 7 and fills all the empty hollows parts that remain between the cavities created specifically in the mould. Following the moulding process, the solidified aluminum alloy joins the titanium tube, with a coupling sufficiently intimate to transmit heat well, thus obtaining a module 6 of the tube assembly 5.

As already indicated, between the superimposed modules 6 passageways are defined, configured to enable the combustion fumes produced by burner 10 to flow in a substantially radial direction—indicated with Y in FIG. 6—from the hollow volume V of the assembly 5 to the outside of the assembly itself, before reaching the fume outlet 11 defined in casing 2.

In this way, the combustion fumes can yield heat to the thermally conductive bodies 8 of the modules 6, which in turn yield heat to the tubes 7 of modules 6, for thereby heating the water flowing into the hydraulic circuit between the inlet 12a and the outlet 12b of the exchanger 1. The thermally conductive body 8 of each module 6 is designed in general to improve the heat exchange phase with respect to the combustion fumes, as explained below.

The thermally conductive body 8 defines an upper face and a lower face of the respective module 6, and at at least one of these faces the body 8 defines respective fins. In various preferred embodiments, the body 8 of each module 6 defines respective fins both at the aforementioned upper face and at the aforementioned lower face. Referring in particular to FIGS. 4-6, the aforementioned upper fins are indicated with 22, whereas the aforementioned lower fins are indicated with 23. As can be seen, fins 22 and 23 extend in height substantially in the axial direction of tube assembly 5 or in the direction of juxtaposition of the modules 6 (X, FIG. 2), and extend in length substantially in the radial direction of tube assembly 5 (Y, FIG. 6).

In general terms, the upper 22 fins of the body 8 of a lower module 6 are in an axially staggered position with respect to the lower 23 fins of the body 8 of an adjacent upper module, with the upper fins 22, on the one hand, and with the lower fins 23, on the other hand, which are at mutual distances such that the upper fins 22 of the body 8 of the lower module 6 can be set between the lower fins 23 of the body 8 of the upper module 6, or vice versa. As can be imagined, in this way, the previously mentioned passageways for the combustion fumes are each defined between an upper fin 22 of the body 8 of the lower module 6 and a lower fin 23 of the body 8 of the upper module 6, or vice versa.

The concept can be better understood by referring to FIGS. 12-15, which exemplify the superposition of two modules 6, and particularly an upper module, identified by $6_x$, and a lower module, identified by $6y$ (note that the subscript indications "x" and "y" are also used in relation to parts of the modules in question, for an easier understanding of various figures). From FIG. 13 it is noted in particular how the lower fins $23_x$ of the module $6_x$ are in an axially staggered position with respect to the upper fins $22_y$ of the module $6_y$, such that that—following superimposition of the two modules—the fins $22_y$ of the module $6_y$ are set between the fins $23_x$ of the module $6_x$, and vice versa. In the non-limiting example shown, each module $6_x$ and $6_y$ has both upper fins and lower fins, with the upper fins $22_x$ of the module $6_x$ that are axially offset with respect to the corresponding lower fins $23_x$, and likewise with the upper fins $22_y$ of the module $6_y$ that are axially offset with respect to the corresponding lower fins $23_y$. It will therefore also be appreciated by FIGS. 12-13 that, in various preferential embodiments, at least some of the modules of the tube assembly of the heat exchanger according to the invention can have substantially the same shape.

Figure 14:
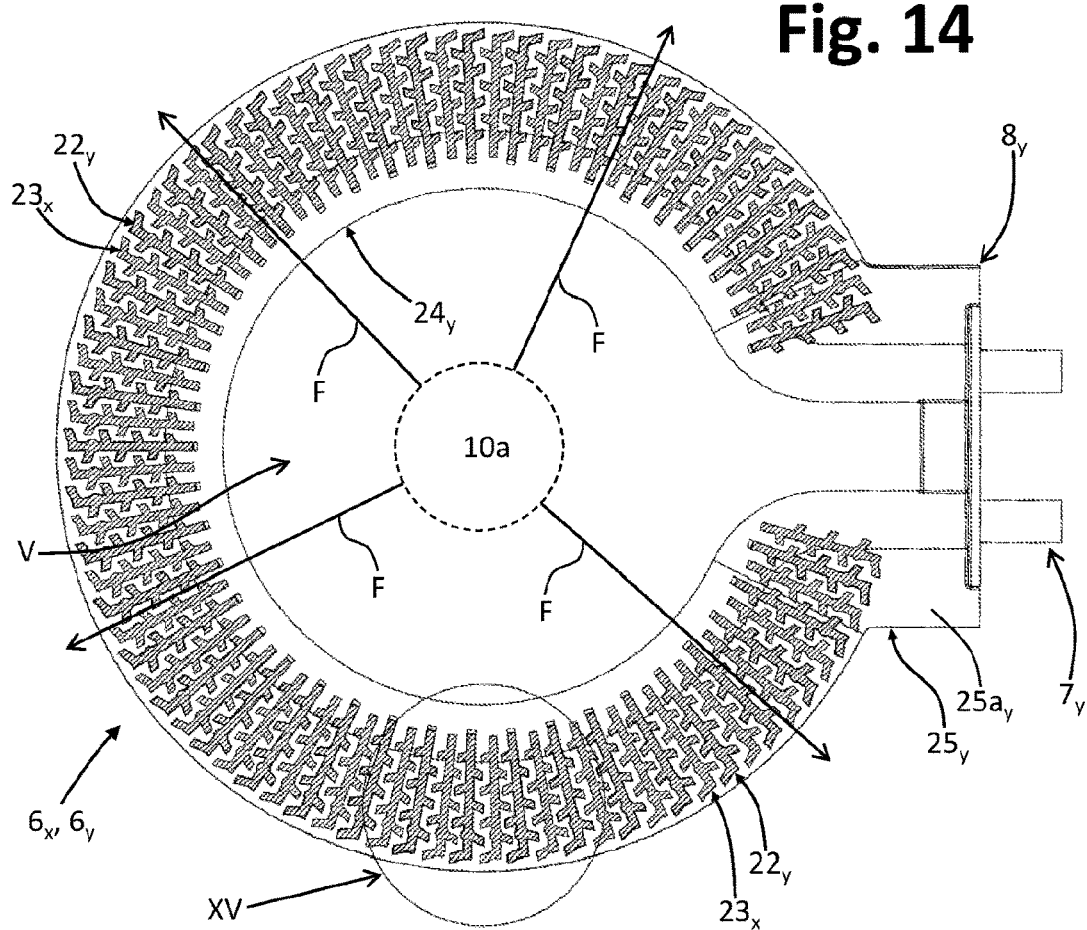
FIG. 14 is a schematic section according to line XIV-XIV of FIG. 13.
Figure 15:
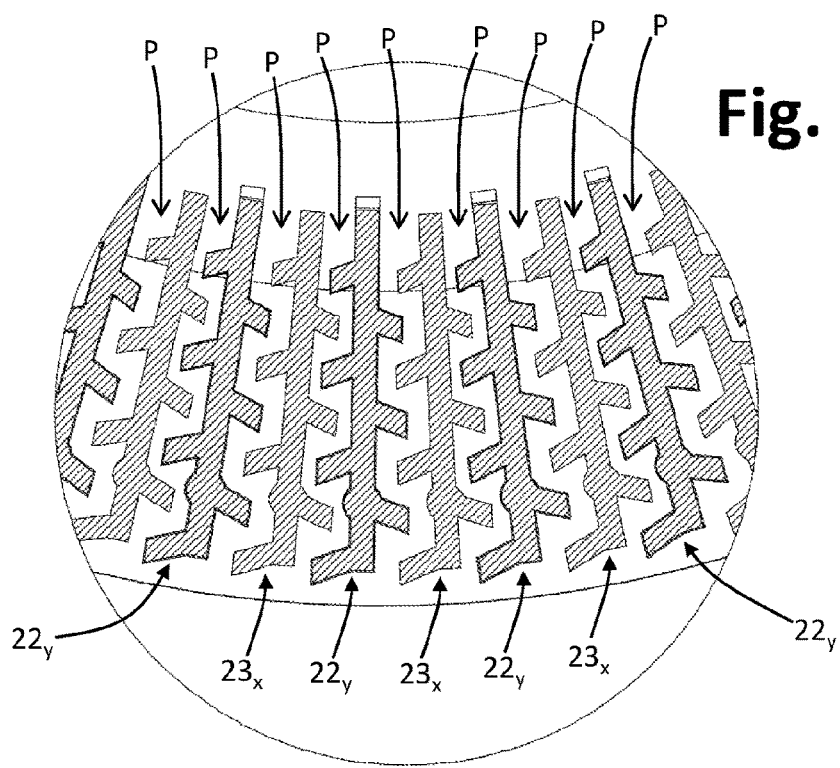
FIG. 15 is a larger-scale detail of FIG. 14.

The result of the superimposition of the two modules $6_x$ and $6_y$ is clearly visible from the section of FIG. 14, and even better in the corresponding detail of FIG. 15, where it is clear that the fins $23_x$ are interposed to the fins $23_y$, and vice versa, in order to define between them passageways P sufficiently narrow for the combustion fumes.

In various preferential embodiments, the upper fins and/or the lower fins of the modules 6 are shaped in such a way that the aforementioned passageways P define a tortuous or meandering path for the combustion fumes.

For this purpose, in various embodiments, the upper fins 22 and/or the lower fins 23 include a primary fin portion, which extends in length substantially in the radial direction (Y, FIG. 6), and a plurality of secondary fin portions, which extend in a transverse direction with respect to the corresponding primary fin portion.

This characteristic can be appreciated for example in FIGS. 7-11. Referring in particular to the detail of FIG. 11, with reference to the upper fins 22 visible in this figure, it can be noticed the presence of the aforementioned primary fin portion, indicated by 22a, which extends substantially in the radial direction, and of the aforementioned secondary fin portions, indicated with 22b, which extend in a transverse direction with respect to the corresponding primary portion 22a. From the same figure it can be seen that, in preferential embodiments, the secondary fin portions 22b extend at both the opposite side faces of the respective primary fin portion 22a. However, the secondary fin portions might even be present on one side only of the respective primary fin portion.

Figure 16:
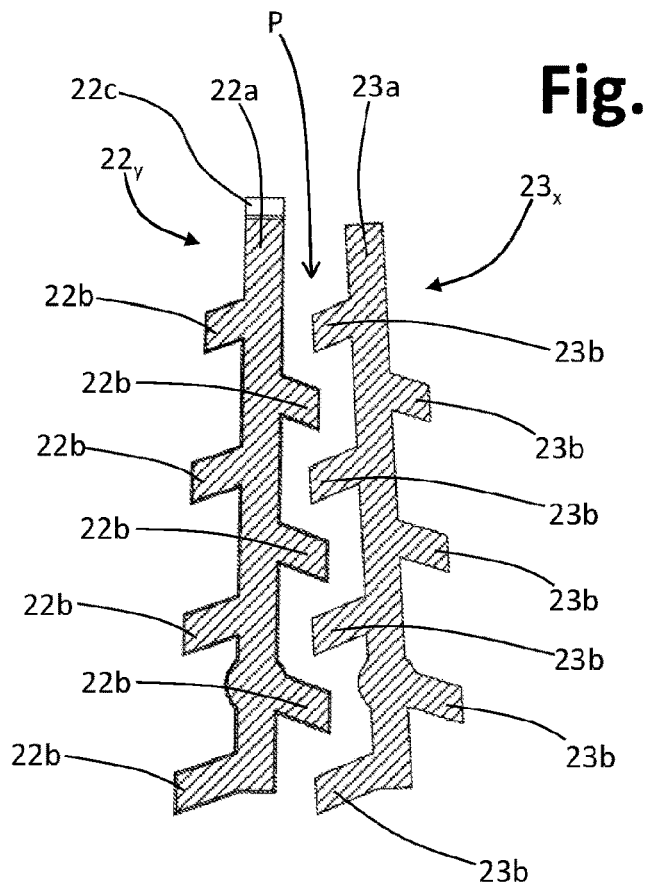
FIG. 16 is a schematic representation, on a larger scale, of two fins of the detail of FIG. 15, each of which belongs to one of the two modules of FIG. 12.

From the detail representations of FIGS. 15 and 16 it is instead possible to appreciate how, in various embodiments, the upper fins and the lower fins, here indicated with $22_y$ and $23_x$, respectively, have substantially the same shape.

As mentioned, during operation of the exchanger, the combustion fumes produced by a flame at the burner tend to flow in a radial direction from the inner volume defined by the tube assembly to the outside thereof. The concept is exemplified in FIG. 14, wherein with F are exemplified the fumes that are produced by the flame at the flame holder 10a of the burner, which fumes flow in a radial direction through the passageways defined between the fins 22, 23.

Figure 17:
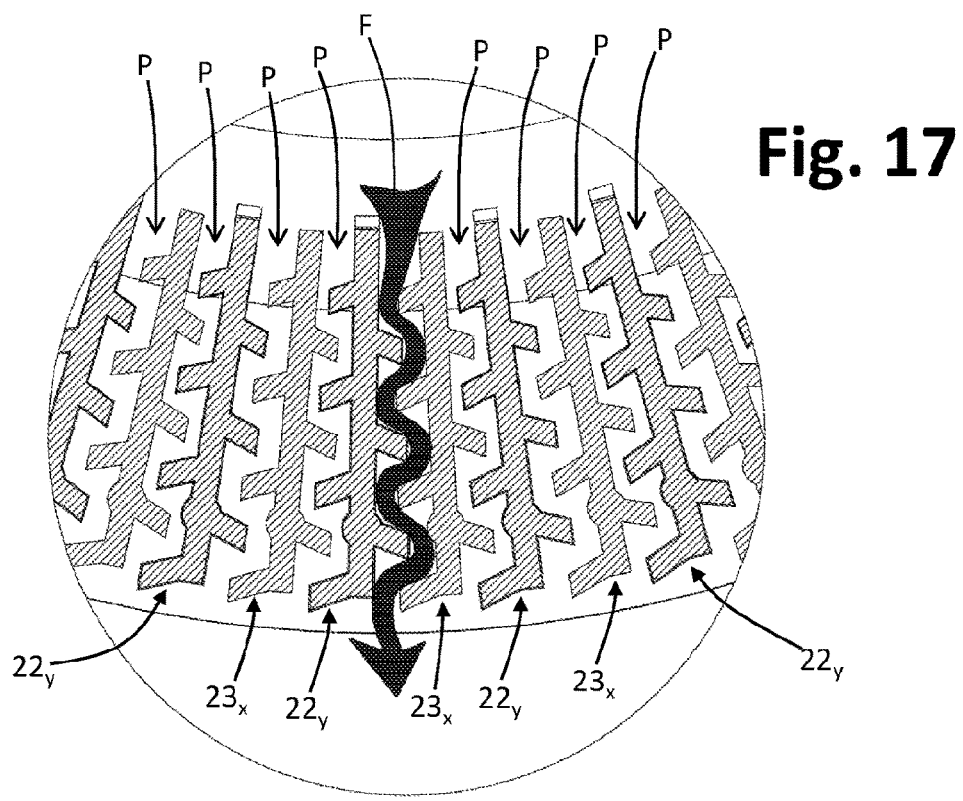
FIG. 17 is a detail similar to that of FIG. 15, intended to exemplify a transit path for combustion fumes between two contiguous fins of the two modules of FIG. 12.

As mentioned, these passageways, indicated with P in FIGS. 15-17, preferably have a generally tortuous development, thanks to the geometry of the fins 22, 23, so that also the F fumes will be induced to lick the fins in a correspondingly tortuous way. The concept is exemplified in FIG. 17 in relation to only one of the passageways, not indicated but crossed by a meandering flow of fumes F between two adjacent fins $22_y$ and $23_x$.

The presence of the transverse portions 22b, 23b of the adjacent fins $22_y$ and $23$ also allows to reduce the amplitude of the passageways P, with the combustion fumes F thus tending to acquire a greater transit speed. If, on the one hand, the flows of the F fumes are faster when crossing the passageways P, on the other hand the length of these passageways is increased, thanks to their tortuousness: the contact time of the fumes with the surfaces of the fins 22, 23 is also in any case increased in a certain way, with the result that a greater amount of heat is transferred from the combustion fumes to the 8 bodies of the modules 6.

Figure 10:
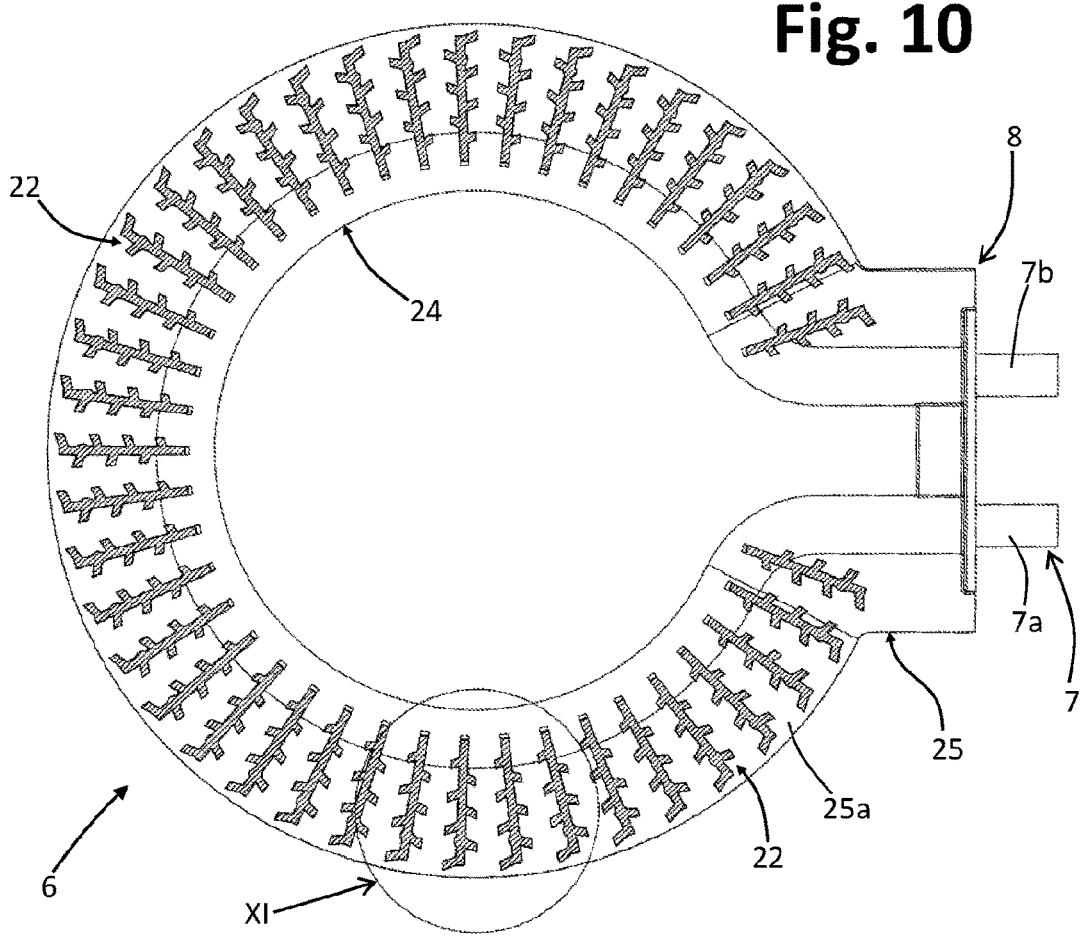
FIG. 10 is a schematic section according to line X-X of FIG. 9.
Figure 11:
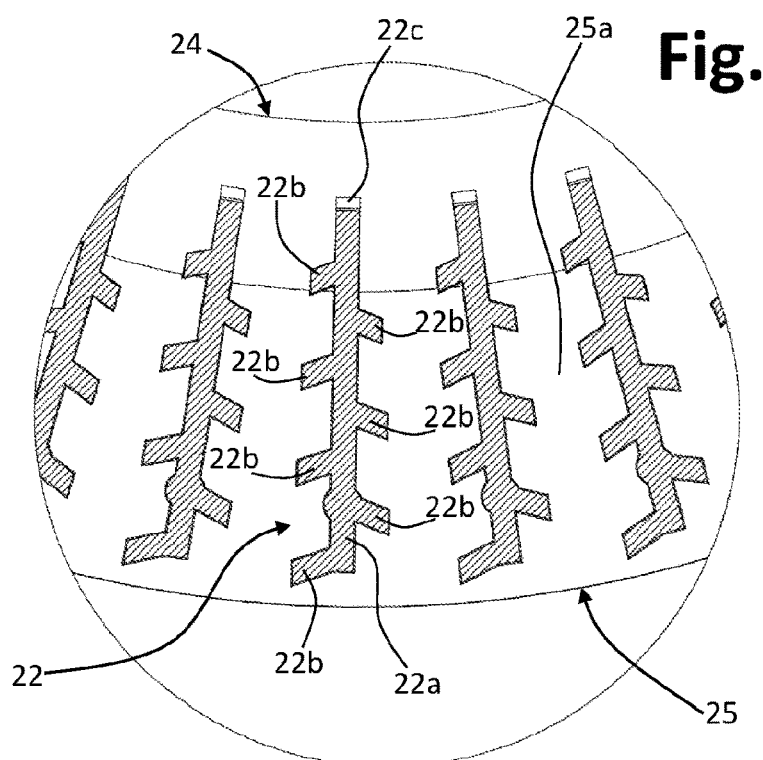
FIG. 11 is a larger-scale detail of FIG. 10.

It should be emphasized, with reference for example of FIG. 10, that—although shaped in the way indicated—the upper fins 22 (but this also applies to the lower fins 23) are at a distance such as not to induce in itself any significant turbulence in the fumes, nor such as to determine a significant increase in the speed of the fumes in transit. In fact, it is only as a result of the interposition between the fins of a module with the fins of an adjacent module that the presence of sufficiently narrow and tortuous passageways is determined, such as to impose on the fumes in transit in the passageways P a meandering path and an increase in speed, although without substantial pressure drops.

Still referring to the detail of FIG. 16, it is noted that—in various embodiments—at least some of the secondary portions 22b or 23b of a fin 22 or 23 extend partially in the gap bounded by two secondary portions 23b or 22b. respectively, of the adjacent fin 23 or 22. As it can be imagined, this feature enables to increase the tortuosity of the passage routes P for the fumes. From the same figure it can be seen how, in various embodiments, the secondary portions 22b or 23b extend from the primary portion 22a or 23a in a direction generally inclined in the direction of the flow, in order to favor the flow and increase the heat exchange efficiency.

In various embodiments, in the thermally conductive body 8 of each module 6 there can be identified at least:
 a first body portion, at least approximately annular, in which the respective tube is at least partially embedded, and
 a second body portion, which extends in a radial direction from the first body portion and from which corresponding parts of the respective upper and/or lower fins project in the axial direction.

The above said first and second body portions are indicated by 24 and 25, respectively, in various figures; in various figures, with 25a and 25b the upper and lower sides of portion 25 are indicated, from which the upper fins 22 and lower 23 project, respectively.

Figure 8:
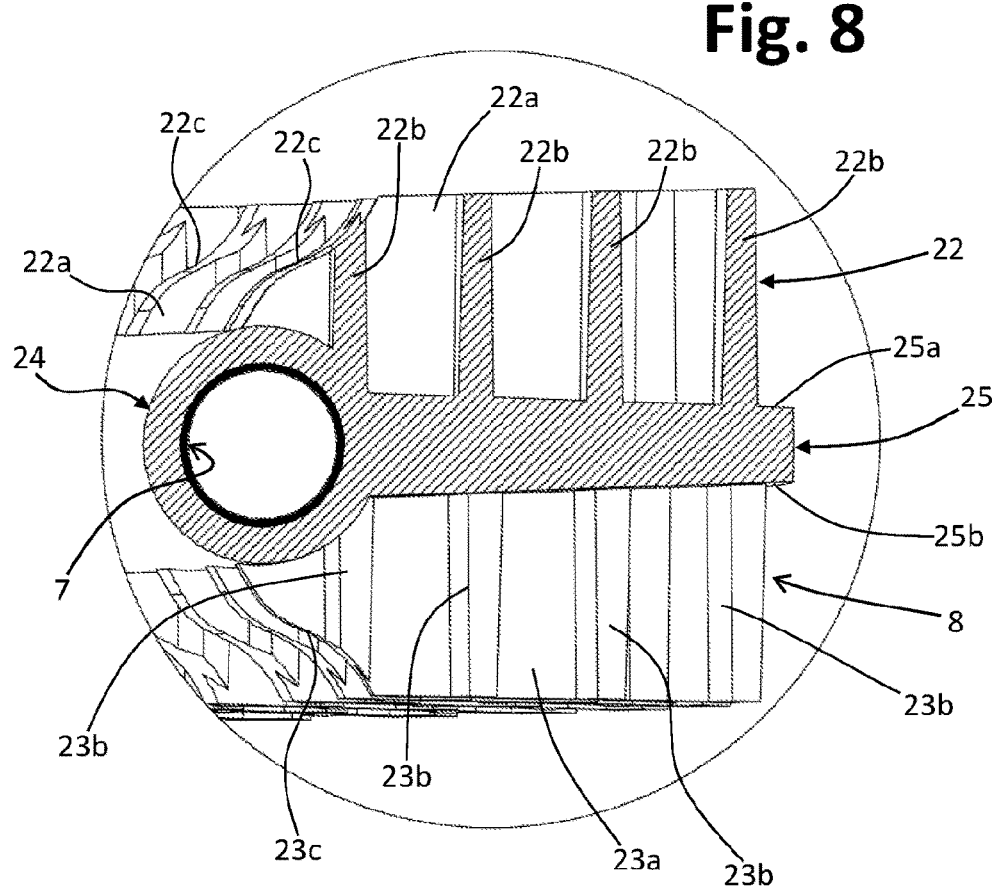
FIG. 8 is a larger-scale detail of FIG. 7.
Figure 9:
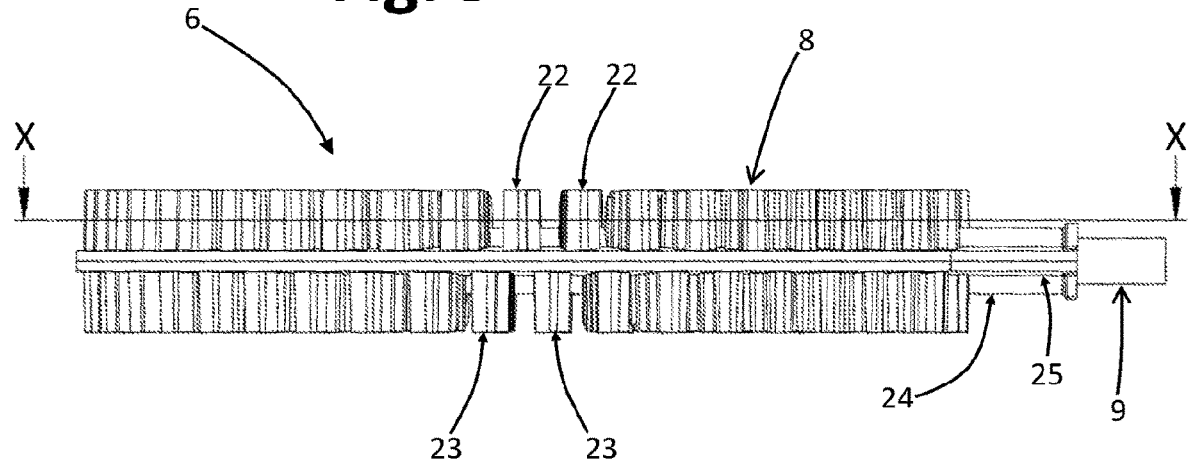
FIG. 9 is a side schematic view of a module of the type shown in FIG. 4.

Referring to examples of FIGS. 4, 7 and 8, it is noted that, in preferred embodiments, the first body portion 24 has an approximately circular cross section, and the tube 7 is embedded therein, while the second body portion 25 is configured substantially as a wall that departs substantially cantilevered from the first body portion 24, preferably with an approximately trapezoidal cross section, the minor base of which is opposite to the first body portion 24. These shapes are not, however, mandatory, but the aforementioned substantially trapezoidal shape is particularly advantageous, as it enables to have a greater mass of heat exchange in the transition zone between portion 24, which integrates the tube 7, and portion 25 defining the fins 22, 23.

Preferably the first portion 24 of the body 8 has an inner side intended to be directly exposed to the burner, and substantially on the opposite or external side there project the second portion 25 bearing the fins 22 and 23. In various preferential embodiments, the aforementioned inner side of the portion 24, in which tube 7 is integrated, is free of fins, that is, it has a substantially smooth surface: this in consideration of the fact that this inner side is in any case directly exposed to the flame holder of the burner, and on it the combustion fumes at a higher temperature affect; this inner side is additionally subject to heating by direct irradiation by the flame. On the other hand, the second portion 25 of the body 8 extends from the outer side of the first portion 24, with the consequence that the fins 22, 23 are in a more protected position, in the sense that they are not substantially subject to direct irradiation and are licked by the fumes when they have already yielded a significant part of their heat to the inner side of portion 24 that integrates the tube 7. This provision thus makes it possible to safeguard the integrity of the fins 22, 23.

With particular reference to FIGS. 7 and 8, in preferential embodiments, an initial part of the upper fins 22 and the lower fins 23 project in the axial direction also from the first body portion. This initial part, denoted by 22c and 23c, respectively, has preferably a top shaped to define a supporting surface for an adjacent module 6, particularly of its first body portion 24. In the example, the upper side of the fin part 22c or 23c includes a generally curved surface, here essentially S-like, to provide precise support for the cylindrical surface of the first body portion 24 of the module 6 above or below. The particular shape illustrated for the top of the fin part 22c and 23c also effectively performs a centering function between the stacked 6 modules.

In the exemplified embodiments, the bodies 8 have a closed annular shape, in that they are provided in their front area with a connection portion, indicated by 8a only in FIG. 5, which joins together the ends of the body part 24 and the body part 25, and at which the end portions of the tubes 7 are designed to protrude. This shape is advantageous as it allows to increase the structural strength of the modules, but it is not however imperative, as also the 8 bodies, as it is the case of the tubes 7 exemplified, could have an open annular shape.

It should also be noted that tubes 7 do not necessarily have to develop according to an arc of a circle of less than 360°, since they can be wound in a spiral or a helix, with one or more turns. FIGS. 18 and 19 exemplify for this purpose the case of two tubes 7' and 7" coiled to form substantially flat spirals, particularly with three and two turns, respectively.

As said, in the operation of the exchanger 1, a flame produced by the burner 10—in particular at its flame holder 10a—generates combustion fumes, which are induced to leave the internal volume V of the tube assembly 5 in the radial direction Y.

The inner side of the first portion 24 of the body 8 of the module 6 is licked directly by the fumes F; thanks to its cylindrical surface, this inner side of portion 24 helps to direct the flows of fumes F in the areas comprised between two modules, where the passageways P are defined. The fumes F then travel along the passageways P defined between the fins 22 and 23 of the various stacked modules, reaching the annular interstice or gap defined between the tube assembly 5 and the peripheral wall 3a of the casing 2 of the exchanger 1, and then are evacuated through the fume outlet including the connection 11.

Hence, the fumes F hit the thermally conductive body 8 of the modules, yielding heat to them, which is transferred to the respective tubes 7, and then to the liquid that circulates thereinto. As it can be seen, the mass represented by the body 8 has overall increased contact surfaces for the heat exchange with the fumes, thanks to presence of the fins 22, 23, to advantage of efficiency. The high heat exchange is guaranteed by the direct exposure of the inner side of the first body portion 24 housing the tube 7, which is directly licked by the fumes, and by the fact that the outer side of this portion 24 still receives a high amount of heat "captured" by the second portion of body 25 equipped with the fins 22, 23.

As indicated, the preferred use of titanium or alloys thereof for the realization of the tubes 7 is particularly advantageous in the case in which the exchanger 1 is intended to heat aggressive liquids, such as chlorinated or salt water for swimming pools or the like. The use of aluminum or alloys thereof for the realization of the thermally conductive bodies 8 allows for efficiently capturing the heat of the combustion fumes and transmit it to the titanium tubes, and therefore to the liquid circulating inside them.

Finally, it will be appreciated that the invention enables a high flexibility of production, since prearrangement of tube assembly for exchangers of different thermal power is easily obtainable by varying the number of modules that make up the assembly to be produced.

From the given description, the characteristics of the present invention are clear, as well as clear are its advantages.

It is clear that numerous variants are possible for the person skilled in the art to the heat exchanger and the tube-assembly module described as an example, without departing from the scope of the present invention, as defined by the claims that follow.

Figure 21:
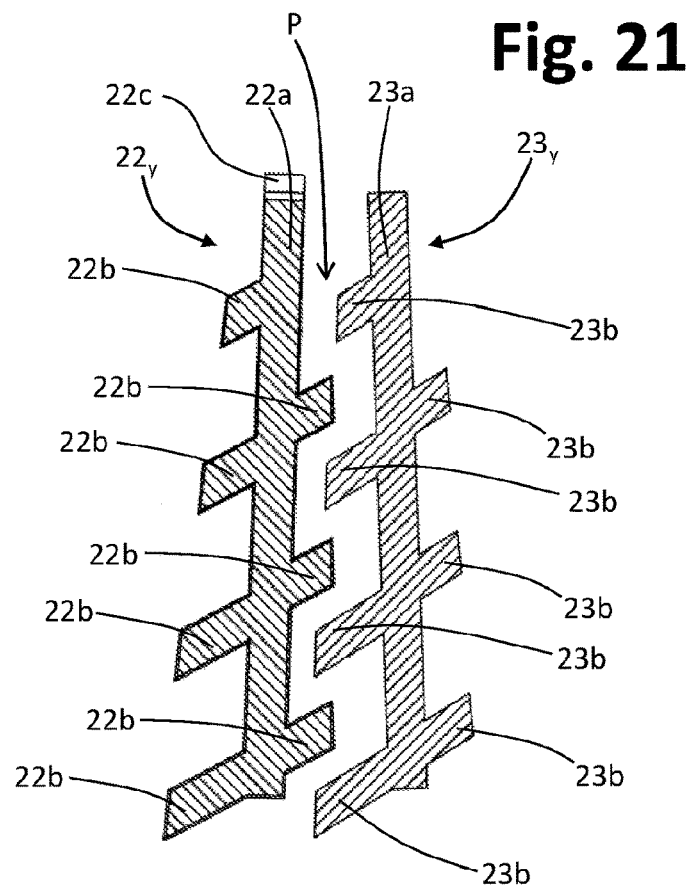
Figure 22:
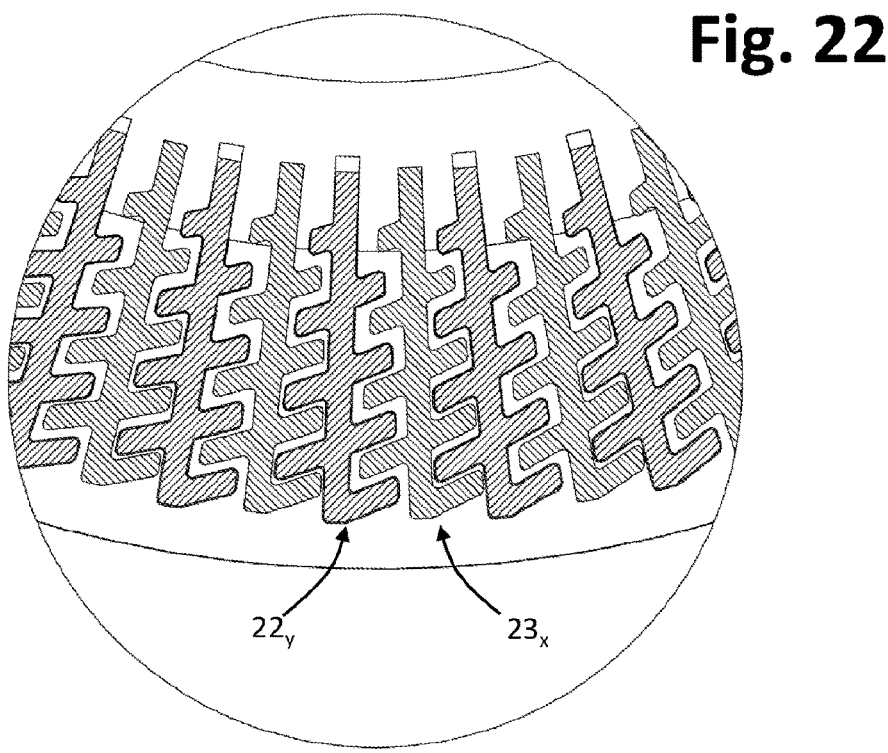
Figure 23:
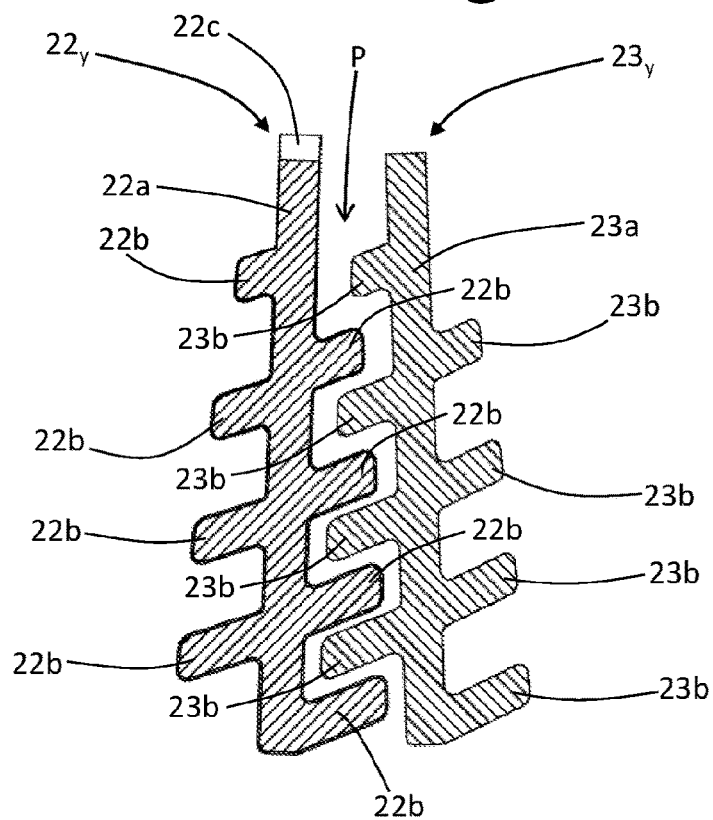

In FIGS. 20-21, a possible alternative geometry is represented for the fins 22 and 23, in any case distinguished also in this case by a primary portion 22a and 23a and by transverse secondary portions 22b and 23b. Unlike the previously exemplified embodiments, in this case the secondary portions 22b and 23b that project on one side of the primary portion 22a and 23a of the fins are inclined in the direction of the flow, while the secondary portions 22b and 23b that project on the opposite side of the same primary portion 22a and 23a are inclined in an opposite direction with respect to the flow, with an increase in the turbulence of the fumes. A further substantially similar variant is shown in FIGS. 22-23.

Figure 24:
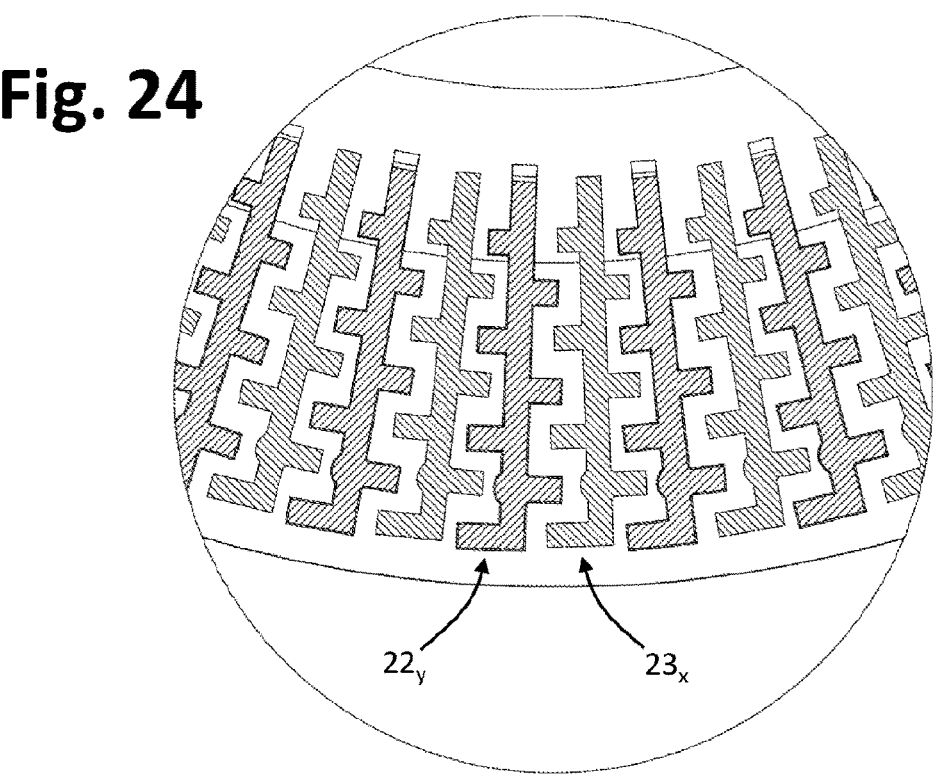
Figure 25:
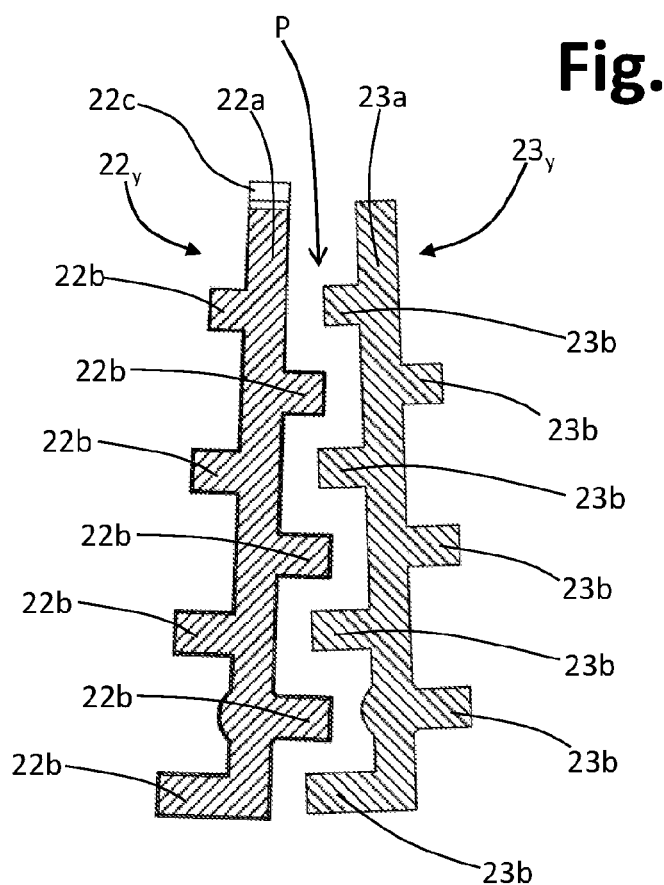

The transverse portions 22b and 23b of the fins 22 and 23 may in any case be not inclined, although this slightly reduces efficiency. An example of this type is shown in FIGS. 24-25, wherein the secondary portions 22b and 23b extend substantially orthogonal from the respective primary portions 22a and 23a.

Figure 26:
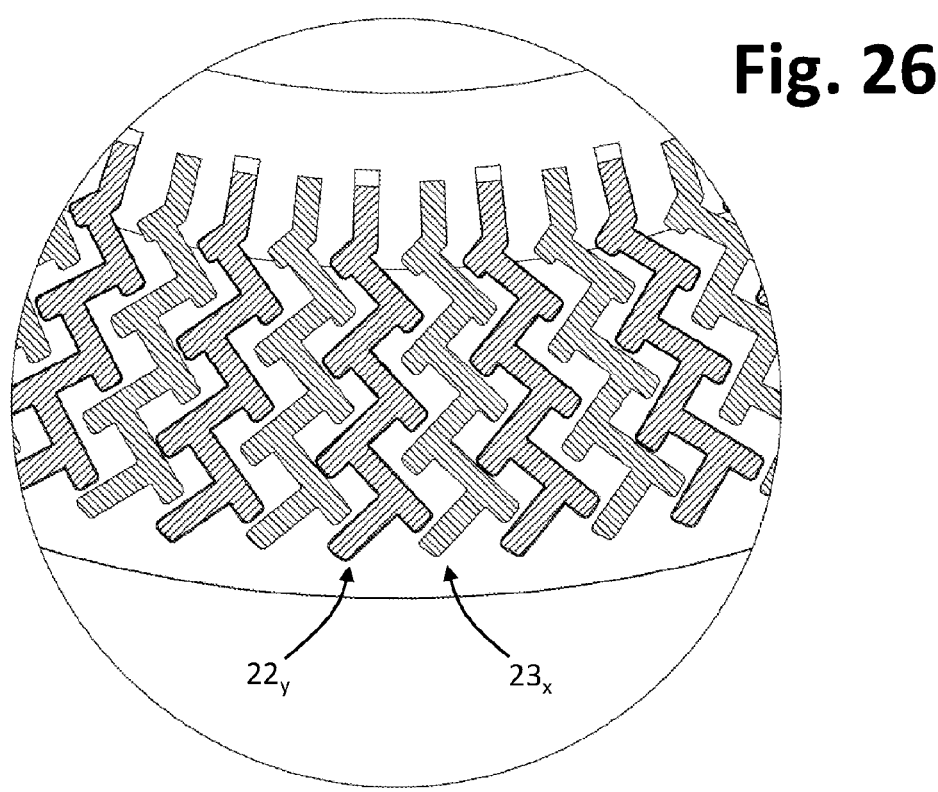

FIGS. 26-27 illustrate a further possible alternative configuration of the fins, here having a primary fin portion having an approximately zigzag shape, which in any case extends in length substantially in the radial direction Y. In the specific example, the primary fin portion includes a succession of wall sections 22a' and 23a' joined substantially at a right angle. These wall sections 22a' and 23a' are joined in intermediate areas thereof, such that their free ends define in any case also portions of secondary fins 22b and 23, suitable to reduce locally the passage section for the fumes and increase the tortuosity of the corresponding flow.

In the case exemplified in the figures, wherein the modules 6 are equal to each other, the spaces defined between the upper fins 22 of the head module ($6_1$, FIGS. 2-3) and the spaces defined between the lower fins 23 of the bottom module ($6_6$, FIGS. 2-3) are preferably occluded, particularly by means of the cited masses of thermally insulating material (9, FIG. 2). This is done in order to prevent the fumes F from finding preferential (wider) routes for the exit from the internal volume V of the tube assembly 5.

For this purpose, it should also be noted that within the hollow volume V, at the front of the modules 6 (i.e., the part in which it is also comprised the connection portion 8a of FIGS. 5-6), a mass of thermally insulating material can be installed, which is for example axially extended for the whole length of the assembly 5, also suitable to avoid unwanted exits of the fumes from the aforementioned front of the modules.

By the way, in possible variant embodiments, the same modules 6, and in particular their overmoulded body 8, may be shaped in such a way as to define specific walls suitable to guarantee, following the juxtaposition of the modules themselves, the absence of any unwanted passages for the escape of fumes outside of the hollow volume V of the tube assembly 5. Such a case is represented in FIGS. 28 and 29, where one and the same module 6 is shown in perspective at different angles, in order to highlight its upper and lower faces. From these figures it can be seen that in this case the body 8 defines, at its upper face (FIG. 28) and lower face (FIG. 29), upper and lower baffles, designated by 8b and 8c, respectively, aimed at preventing the escape of fumes at the front of the modules 6.

Following juxtaposition of two modules, the baffles 8c of a lower module 6 will rest on the baffles 8b of an upper module 6, thus substantially forming a barrier suitable for preventing fumes from leaking, and thus affecting the efficiency of the tube assembly. In the example, baffles 8b and 8c are configured in the form of walls that extend along respective stretches of the portion that wraps the tube 7, each substantially between the first fins 22 or 23 of a respective series and the connection portion 8a: it is however evident that other geometries of the body 8 suitable for the indicated purpose are possible.

It should also be pointed out that the upper and lower module of a tube assembly of the type described herein do not necessarily have to be fitted with upper fins and lower fins, respectively. Such a case is exemplified in FIGS. 30 and 31, through views similar to those of FIGS. 2 and 3.

In this case, the upper module $6_1$ and lower module 66 of assembly 5 have a shape different from the intermediate modules $6_2$-$6_5$, which have a structure similar to that already described above. Referring in particular to the upper module $6_1$ shown in FIG. 31, only the lower fins 23 extend from the second portion 25 of the thermally conductive body 8. By contrast, in the upper part, the second portion has a peripheral wall 26, herein having a circular profile, in order to create a housing suitable for receiving the disc of thermally insulating material indicated with 9' in FIG. 30. In this construction, preferably, at the upper surface of portion 25 radial stiffening ribs 27 are defined, which extend between the first portion 24 housing the tube 7 and the aforementioned peripheral wall 26.

Figure 30:
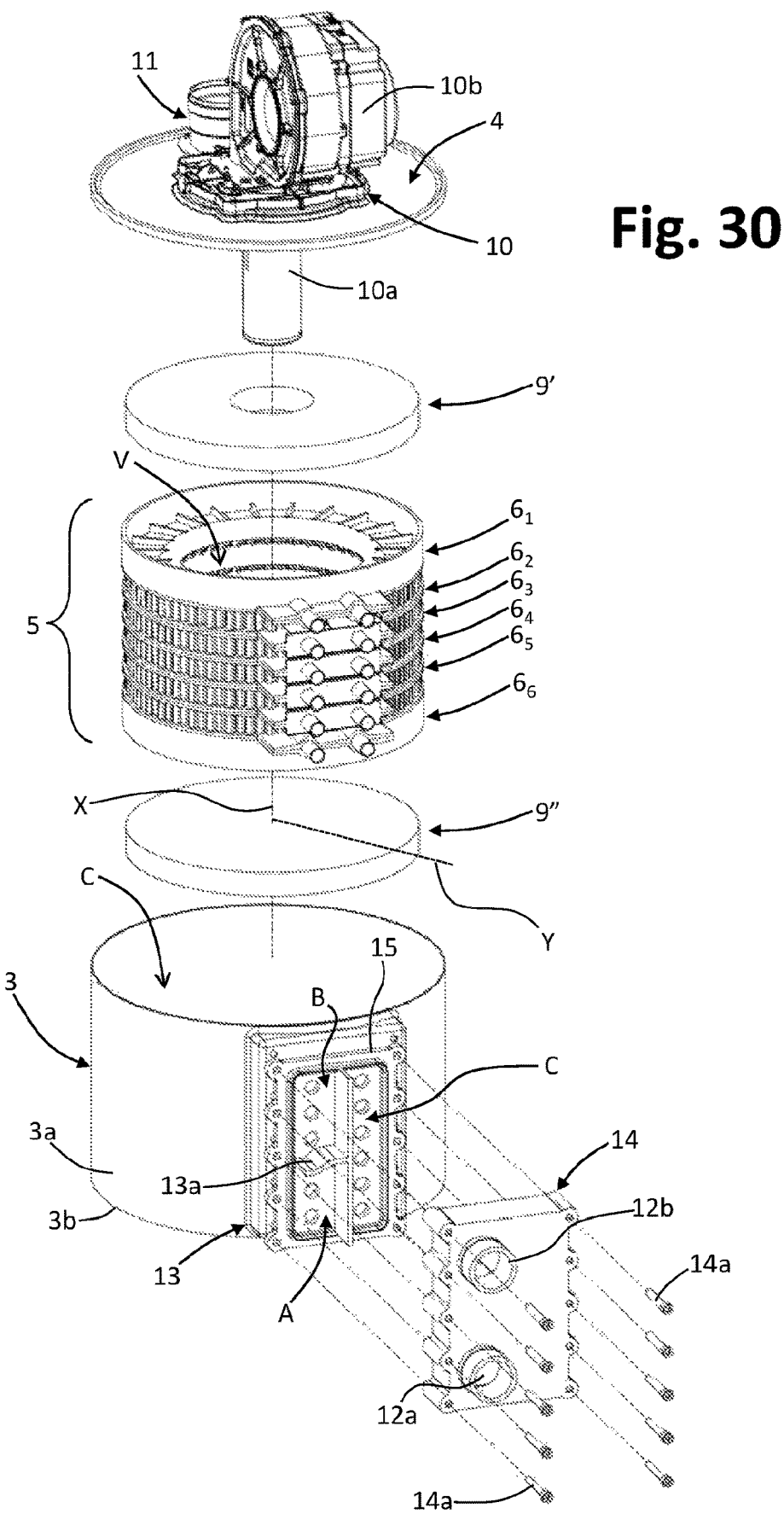
FIGS. 30 and 31 are views similar to those of FIGS. 2 and 3, relating to further possible variants embodiments.
Figure 31:
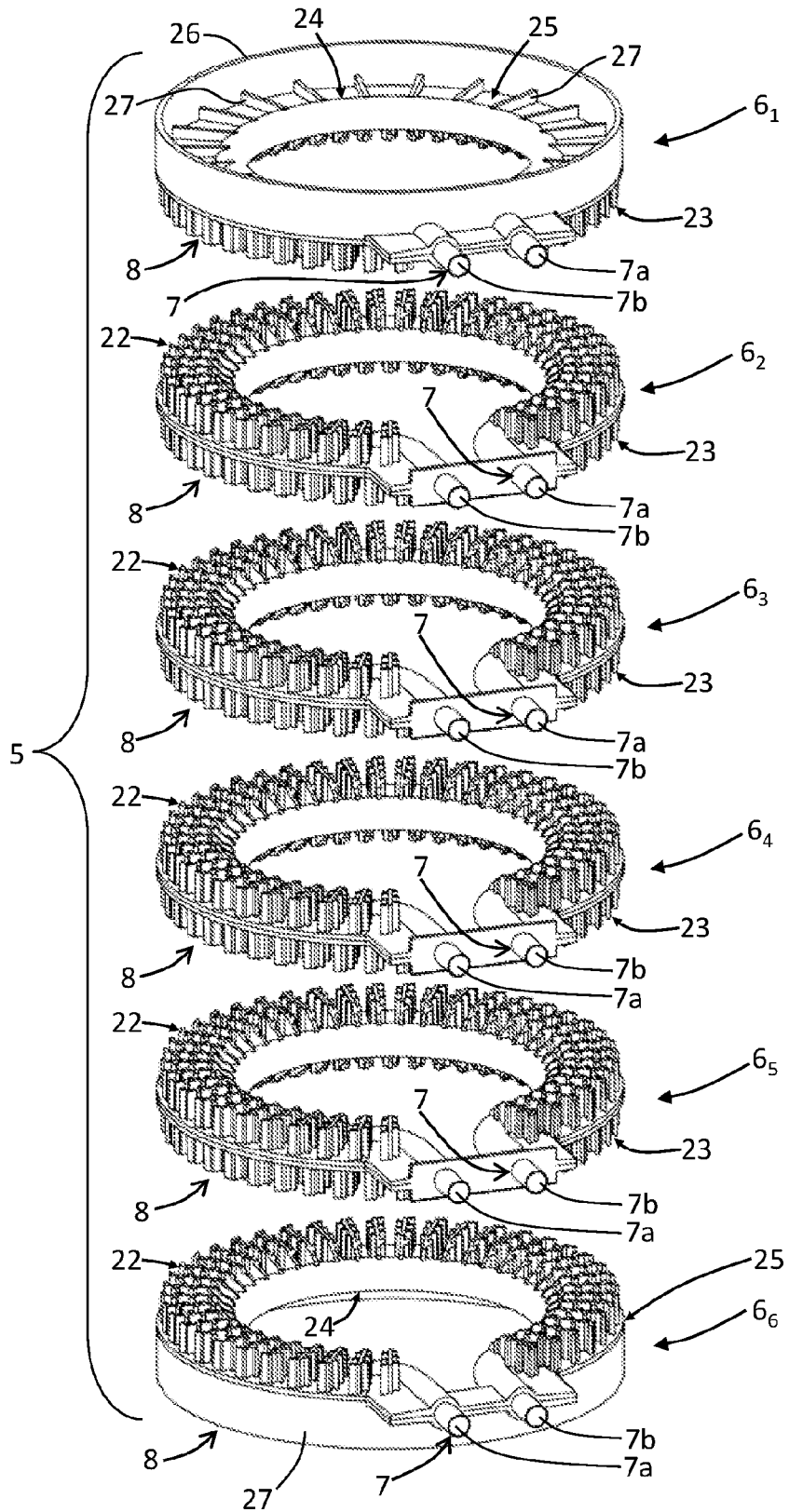

The construction of the lower module 66 of FIG. 31 is substantially similar to that of the upper module $6_1$, but with the difference that in this case only the upper fins 22 will extend from the second portion 25 of the thermally conductive body 8. Also the second portion 25 of module $6_6$ defines—on the opposite side with respect to the fins 22—the peripheral wall 26 and possible radial stiffening ribs (not visible), with this wall 26 that creates a housing suitable to receive the disc of thermally insulating material indicated with 9" in FIG. 30.

The functionality of the exchanger exemplified in FIGS. 30-31 are similar to those already described above, with the volume V of the tube assembly 5 which will be substantially closed at its two axial ends through the discs 9' and 9", so as to constrain the fumes to flow only through the passageways defined between the various fins 22 and 23, as described above.

It should be noted that, if at all, an exchanger having reduced thermal power could possibly include a tube assembly 5 formed only by the modules $6_1$ and $6_6$ of FIGS. 30-31, with the lower fins of the former set between the upper fins 22 of the latter.

It should also be noted that, within a single module, the upper fins do not necessarily have to be axially staggered with respect to the upper fins: in fact, the modules could be juxtaposed with slightly different angular orientations from each other, while still allowing the lower fins of one module to be in a position set between the upper fins of another module, and vice versa. In such a case, the configuration of connection of the ends of the tubes of the various modules will have to be adapted accordingly, compared to what was previously exemplified.

The invention claimed is:

1. A heat exchanger for a boiler or similar heating device, comprising:
    a casing defining a combustion chamber and having a fume outlet,
    a tube assembly within the casing, the tube assembly including a plurality of separate modules arranged in a juxtaposed configuration, each separate module having an at least approximately annular shape, such that the juxtaposed separate modules define a hollow volume,
    a fuel burner, which is associated to the casing and that extends at least partially in the hollow volume or face-faces it,
    wherein the separate modules each include a respective tube which is at least partially embedded in a respective thermally conductive body, the thermally conductive body being overmoulded to the tube,
    wherein the tube of each separate module is part of a hydraulic circuit of the heat exchanger that extends between at least one inlet and at least one outlet for a fluid that has to be heated,
    wherein between the juxtaposed separate modules passageways are defined, configured for enabling combustion fumes produced by the burner to flow in a substantially radial direction from the hollow volume towards the outside of the tube assembly, before reaching the fume outlet, in such a way that the combustion fumes yield heat to the thermally conductive bodies of the separate modules, which in turn yields heat to the tubes of the separate modules to thereby heat the fluid that flows in the hydraulic circuit between the at least one inlet and the at least one outlet,
    wherein each thermally conductive body defines an upper face and a lower face of the respective separate module, the upper face and the lower face being axially opposite to each other,
    wherein, at least at the upper face of a first separate module and at the lower face of a second separate module, the corresponding thermally conductive body defines upper fins and lower fins, respectively, that extend in height substantially in an axial direction of the tube assembly and that extend in length substantially in a radial direction of the tube assembly, wherein the upper fins of the thermally conductive body of the first separate module are in a position axially staggered with respect to the lower fins of the thermally conductive body of the second separate module, with the upper fins, on the one hand, and with the lower fins, on the other hand, which are at mutual distances such that the upper fins of the thermally conductive body of the first separate module are set between the lower fins of the thermally conductive body of the second separate module, or vice versa, in such a way that the passageways for the combustion fumes are each defined between an upper fin of the thermally conductive body of the first separate module and a lower fin of the thermally conductive body of the second separate module, or vice versa, wherein the upper fins and the lower fins are configured such that, upon axial juxtaposition of the first separate module and the second separate module, the upper fins of the first separate module are interposed with the lower fins of the second separate module to define tortuous radial passageways for the combustion fumes, and wherein the thermally conductive body of each separate module comprises:

a first body portion at least approximately annular in shape, in which the respective tube is at least partially embedded, and a second body portion which extends in a radial direction from the first body portion and from which corresponding parts of the upper fins and/or of the lower fins project in an axial direction.

2. The heat exchanger according to claim 1, wherein at the upper face and the lower face of the thermally conductive body of at least some of the separate modules are defined said upper fins and said lower fins, respectively.

3. The heat exchanger according to claim 2, wherein the upper fins are axially staggered with respect to the lower fins.

4. The heat exchanger according to claim 1, wherein the upper fins and the lower fins have substantially one and the same shape and/or at least some of the separate modules have substantially one and the same shape.

5. The heat exchanger according to claim 1, wherein:
the upper fins and/or the lower fins each include a primary fin portion, which extends in length substantially in the radial direction, and a plurality of secondary fin portions, which extend in a transverse direction with respect to the primary fin portion, or else
the upper fins and/or the lower fins each include at least one primary wing portion having an approximately zigzag shape which extends in length substantially in the radial direction.

6. The heat exchanger according to claim 5, wherein the secondary fin portions extend at two opposite lateral faces of the respective primary fin portion.

7. The heat exchanger according to claim 1, wherein the tube of each separate module:
is coiled substantially according to a spiral, or else
extends according to an arc of a circle smaller than 360°, with two end portions at least approximately straight which project towards outside a circumference identified by said arc of a circle.

8. The heat exchanger according to claim 1, wherein an initial part of the upper fins and/or of the lower fins projects in an axial direction from said first body portion, said initial part having a top shaped to define a resting and/or centring surface for an adjacent separate module.

9. The heat exchanger according to claim 8, wherein said top includes a generally curved surface.

10. The heat exchanger according to claim 1, wherein said first body portion has an approximately circular cross-section, and said second body portion is configured as a wall that extends substantially in a cantilever manner from the first body portion.

11. The heat exchanger according to claim 10, wherein said wall that extends substantially in a cantilever manner has an approximately trapezoidal cross-section.

12. The heat exchanger according to claim 1, wherein the tube of each separate module is made of titanium or a titanium alloy, and the thermally conductive body of each separate module is made of aluminium or an aluminium alloy.

13. A heating device, comprising a heat exchanger according to claim 1.

14. The heat exchanger according to claim 1, wherein:
the thermally conductive body of a top separate module of the tube assembly defines at the upper face thereof a housing for positioning a mass of thermally insulating material, and/or
the thermally conductive body of a bottom separate module of the tube assembly defines at the lower face thereof a housing for positioning a mass of thermally insulating material.

15. The heat exchanger according to claim 1,
wherein the tube of each separate module has an inlet portion and an outlet portion,
wherein the heat exchanger further comprises a manifold assembly which includes a connection plate,
wherein the connection plate has a plurality of pairs of through holes, each pair of through holes comprising a first through hole and a second through hole to which the inlet end portion and the outlet end portion of the tube of a corresponding separate module are sealingly fixed, respectively.

16. The heat exchanger according to claim 15, wherein the manifold assembly further comprises a hollow cover which includes the at least one inlet and the at least one outlet for the fluid that has to be heated, the hollow cover being configured to be fixed relative to the connection plate to define therebetween a cavity,
wherein the plate has a shaped baffle, to define within the cavity three separate chambers including:
a first chamber, to which the inlet end portion of the tube of at least a first one of the separate modules is connected in fluid communication,
a second chamber, to which the outlet end portion of the tube of at least a second one of the separate modules is connected in fluid communication, and
a third chamber, to which the outlet portion of the tube of the at least first one of the separate modules and the inlet end portion of the tube of the at least second one of the separate modules are connected in fluid communication,
and wherein the at least one inlet and the at least one outlet for the fluid that has to be heated are fluidically connected to the first chamber and the second chamber, respectively.

17. A heat exchanger for a boiler or similar heating device, comprising:
a casing defining a combustion chamber and having a fume outlet, a tube assembly within the casing, the tube assembly including a plurality of separate modules arranged in a juxtaposed configuration, each separate module having an at least approximately annular shape, such that the juxtaposed separate modules define a hollow volume, a fuel burner, which is associated to the casing and that extends at least partially in the hollow volume or faces it, wherein the separate modules each include a respective tube which is at least partially embedded in a respective thermally conductive body, the thermally conductive body being overmoulded to the tube, wherein the tube of each separate module is part of a hydraulic circuit of the heat exchanger that extends between at least one inlet and at least one outlet for a fluid that has to be heated, wherein between the juxtaposed separate modules passageways are defined, configured for enabling combustion fumes produced by the burner to flow in a substantially radial direction from the hollow volume towards the outside of the tube assembly, before reaching the fume outlet, in such a way that the combustion fumes yield heat to the thermally conductive bodies of the separate modules, which in turn yields heat to the tubes of the separate modules to thereby heat the fluid that flows in the hydraulic circuit between the at least one inlet and the at least one outlet, wherein each thermally conductive body defines an upper face and a lower face of the respective separate module, the upper face and the lower face being axially opposite to each other, wherein, at least at the upper face of a first separate module and at the lower face of a second separate module, the corresponding thermally conductive body defines upper fins and lower fins, respectively, that extend in height substantially in an axial direction of the tube assembly and that extend in length substantially in a radial direction of the tube assembly, wherein the upper fins of the thermally conductive body of the first separate module are in a position axially staggered with respect to the lower fins of the thermally conductive body of the second separate module, with the upper fins, on the one hand, and with the lower fins, on the other hand, which are at mutual distances such that the upper fins of the thermally conductive body of the first separate module are set between the lower fins of the thermally conductive body of the second separate module, or vice versa, in such a way that the passageways for the combustion fumes are each defined between an upper fin of the thermally conductive body of the first separate module and a lower fin of the thermally conductive body of the second separate module, or vice versa, wherein the upper fins and the lower fins are configured such that, upon axial juxtaposition of the first separate module and the second separate module, the upper fins of the first separate module are interposed with the lower fins of the second separate module to define tortuous radial passageways for the combustion fumes, and wherein:

the thermally conductive body of a top separate module of the tube assembly defines at the lower face thereof only the lower fins, and/or the thermally conductive body of a bottom separate module of the tube assembly defines at the upper face thereof only the upper fins.

18. The heat exchanger according to claim 17, wherein the thermally conductive body of each separate module comprises:

a first body portion at least approximately annular in shape, in which the respective tube is at least partially embedded, and a second body portion which extends in a radial direction from the first body portion and from which corresponding parts of the upper fins and/or of the lower fins project in an axial direction.

19. A separate tube-assembly module for use in a heat exchanger according to claim 1, the separate module having an at least approximately annular shape and including a respective tube which is at least partially embedded in a respective thermally conductive body, the thermally conductive body being overmoulded to the tube, wherein the thermally conductive body has an upper face and a lower face which are axially opposite to each other, at at least one of which upper fins or lower fins are defined, respectively, that extend in height substantially in an axial direction and extend in length substantially in a radial direction, wherein the upper fins, respectively the lower fins, are at mutual distances such that, following upon juxtaposition of two said separate modules, the upper fins of a first separate module are set between the lower fins of a second separate module, or vice versa, in such a way that between each upper fin of the first separate module and each lower fin of the second separate module, or vice versa, a radial passageway for combustion fumes is defined, wherein the upper fins and the lower fins are configured such that, upon axial juxtaposition of the first separate module and the second separate module, the upper fins of the first separate module are interposed with the lower fins of the second separate module to define tortuous radial passageways for combustion fumes, and wherein the thermally conductive body of the separate module comprises:

a first body portion at least approximately annular in shape, in which the respective tube is at least partially embedded, and a second body portion which extends in a radial direction from the first body portion and from which corresponding parts of the upper fins and/or of the lower fins project in an axial direction.

20. A method for obtaining a tube assembly of a heat exchanger for a boiler or the like, the method comprising the steps of:

i) providing a plurality of tubes, ii) moulding over each tube a respective body of a thermally conductive material to thereby obtain a plurality of separate tube-assembly modules, iii) juxtaposing the separate tube assembly-modules according to an axial direction, to thereby form the tube assembly, wherein step i) comprises the operation of giving to each tube an at least approximately annular shape, wherein step ii) comprises moulding the thermally conductive body over the respective tube to define an upper face and a lower face of the respective module which are axially opposite to each other, wherein at at least one of the upper face and the lower face of the thermally conductive body are defined upper fins, respectively lower fins, that extend in height substantially in an axial direction of the tube assembly and that extend in length substantially in a radial direction of the tube assembly, wherein the upper fins, respectively the lower fins, are at mutual distances such that, following upon step iii), the upper fins of a first separate module are set between the lower fins of a second separate module, or vice versa, and between each upper fin of the first separate module and each lower fin of the second separate module, or vice versa, a passageway for combustion fumes is defined, the passageway having a tortuous or meandering path for the combustion fumes, wherein the thermally conductive body of each separate module comprises:

a first body portion at least approximately annular in shape, in which the respective tube is at least partially embedded, and a second body portion which extends in a radial direction from the first body portion and from which corresponding parts of the upper fins and/or of the lower fins project in an axial direction.

\* \* \* \* \*